United States Patent [19]

Sjogren et al.

[11] Patent Number: 5,054,601
[45] Date of Patent: Oct. 8, 1991

[54] SORTING CONVEYOR

[75] Inventors: Christer A. Sjogren, Miami, Fla.; J. D. Houseman, Lake Saint Louis, Mo.; Henri T. Paets, Miami, Fla.

[73] Assignee: Quipp, Incorporated, Miami, Fla.

[21] Appl. No.: 409,520

[22] Filed: Sep. 19, 1989

[51] Int. Cl.$^5$ .............................................. B65G 47/46
[52] U.S. Cl. .................................. 198/365; 198/502.4; 198/805
[58] Field of Search ....................... 198/365, 472.1, 706, 198/802, 805, 502.4

[56] References Cited

U.S. PATENT DOCUMENTS

| | | | |
|---|---|---|---|
| 3,119,488 | 1/1964 | Rabinow et al. | 198/206 |
| 3,510,014 | 5/1970 | Speaker et al. | 198/365 |
| 3,780,297 | 12/1923 | Geary | 198/502.4 |
| 3,848,728 | 11/1974 | Leibrick et al. | 198/365 |
| 3,977,513 | 8/1976 | Rushforth | 198/365 |
| 4,031,998 | 6/1977 | Suzuki et al. | 198/365 |
| 4,259,918 | 4/1981 | Ward et al. | 198/502.4 |
| 4,792,036 | 12/1988 | Heidelberg | 198/805 |
| 4,856,642 | 8/1989 | Nickolson et al. | 198/365 |

Primary Examiner—Joseph E. Valenza
Attorney, Agent, or Firm—Louis Weinstein

[57] ABSTRACT

A bundle distribution system comprised of tilt tray carriers coupled in tandem forming a continuous loop, each conveyor being a link in the loop. Vertical and horizontal wheels guide the conveyors along a closed loop path which may include curved and straight sections as well as vertical curves and inclined path sections. Each carrier includes a pivotally mounted tilt tray normally maintained in an upright position. Linear induction motors (LIMs) cooperate with a conductive plate arranged along the underside of each carrier for propulsion. The LIMs are distributed at spaced intervals along the closed loop track, each carrier being a movable element of the motor. The LIMs are operated in parallel and a speed sensor provides feedback for controlling the operating speed to a tolerance of within ±5%. The cam follower rollers of a tilting assembly follow a movable tilt cam which initially unlocks the tilting mechanism from the locked position followed by tilting of the carriage about its longitudinal axis. Straightening cams on both sides of the track downstream from the opening cam reset the tilted tray and prevent overshooting. The multi-wheel speed sensor assures rolling engagement of at least two of the sensor wheels with at least one of the carts. A top loader which is positioned above the track so as to minimize the space required therefor, is capable of dropping signature bundles onto the desired tray with great accuracy. The tilting cam likewise assures accurate tilting and release of a bundle upon a branching out feed chute.

50 Claims, 24 Drawing Sheets

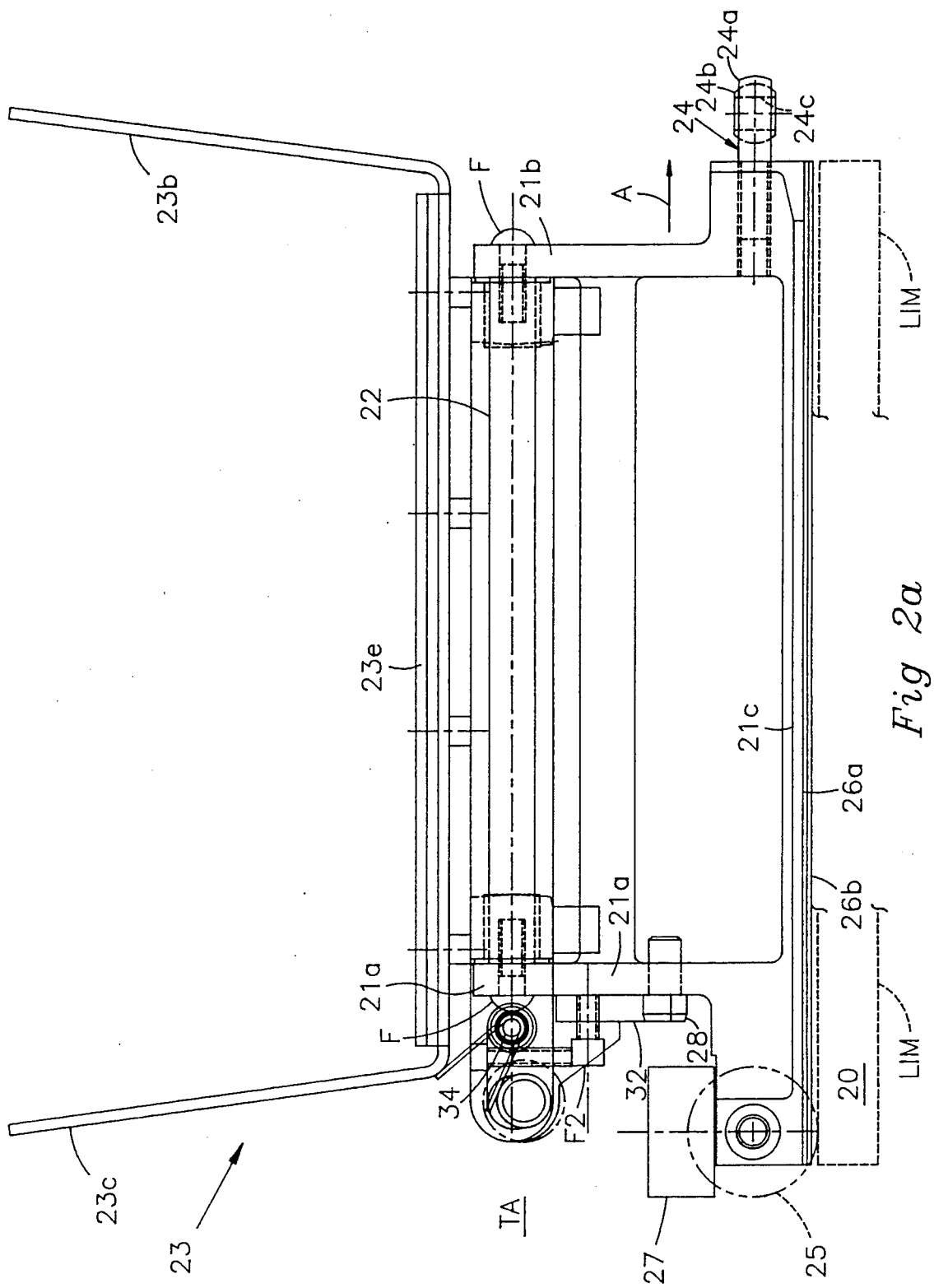

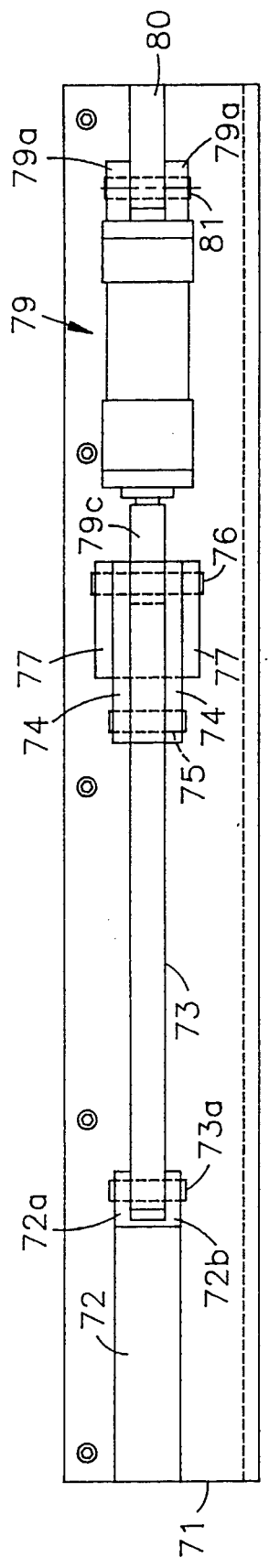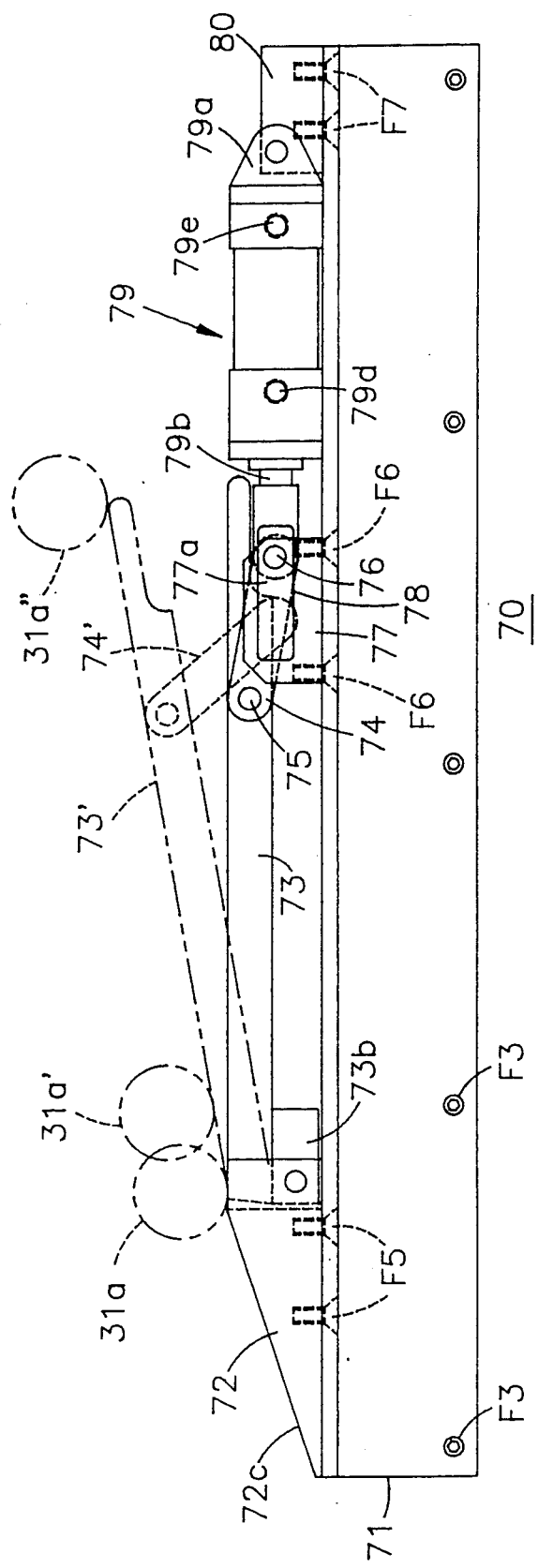
Fig 7b
Fig 7a

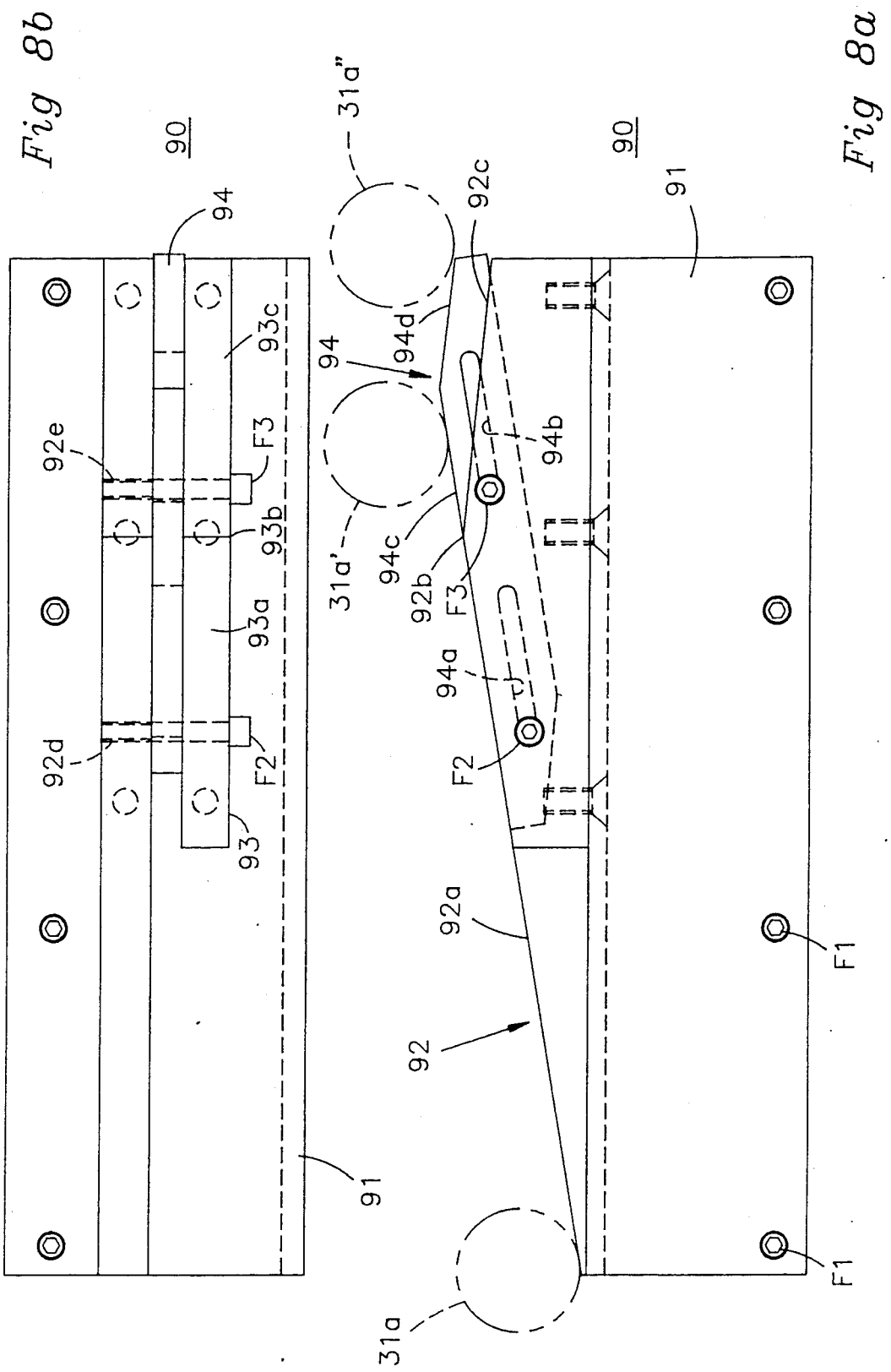

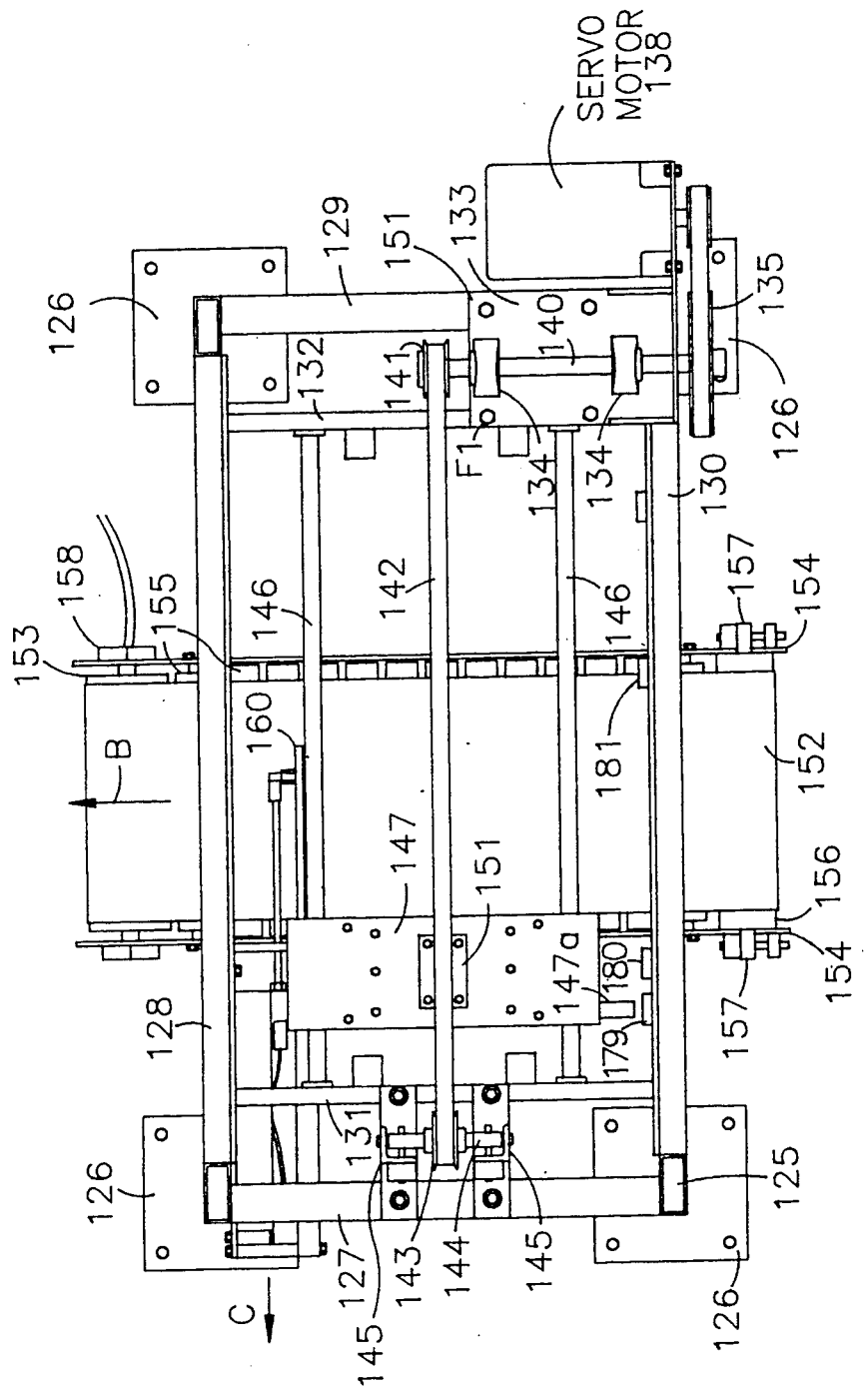

SORTING CONVEYOR

FIELD OF THE INVENTION

The present invention relates to conveyors and more particularly to a novel closed loop conveyor comprised of tilt tray carts coupled in tandem fashion in which the drive means has no moving parts and further in which the tilting mechanism provides reliable tilting and resetting thereof at speeds sufficient to assure dispensing of an object during the short dispensing "window".

BACKGROUND OF THE INVENTION

Tray conveyors have been utilized for conveying products from a delivery location to one of a plurality of output locations. For example, it is conventional to provide a closed loop conveyor comprised of a plurality of tiltable carriers, each being capable of receiving and supporting a product deposited thereon at a receiving location. As the tilt tray moves past an outfeed location, activating means cause the tray to tilt in the proper direction so as to dispense the product being carried thereon down upon a delivery chute. Present day systems employ massive complicated tilting mechanisms and further utilize drive mechanisms requiring a large number of moving parts which undergo significant wearing. It is thus highly desirable to provide a simple, highly reliable conveyor system.

BRIEF DESCRIPTION OF THE INVENTION

The present invention is characterized by comprising a distribution system comprised of a conveyor system of tiltable trays capable of delivering 175 bundles per minute at a modest speed of the order of only 325 feet per minute. The conveyor system is comprised of a plurality of tilt tray carriers connected in tandem fashion in a continuous loop, each tray carrier being constructed so that it serves as a "link" in a "chain" of tray carriers.

Each tray carrier is provided with horizontal and vertical wheels which rollingly engage associated horizontal and vertical guides forming part of a track for precisely following the path of said track. The tray carriers are capable of navigating horizontal curves as small as six (6) feet in radius, vertical curves of ten (10) feet radius and inclination angles of up to 30°.

The drive system is unique in that it eliminates the use of any gear heads or sprockets and, in fact, there is no physical connection whatsoever between the drive and the tray conveyor. This is accomplished through the use of linear induction motors (LIMs), one component (stator) of the motor being secured to the conveyor support structure while the trays themselves serve as the cooperating movable component of the linear induction motor. A distributed drive system comprised of LIMs arranged at spaced intervals along the closed loop path of the track assures that there is never excessive force introduced on the conveyor at any point to provide smooth speed performance while allowing continued conveyor operation even in the event of the loss of any individual drive during use.

Bundles are preferably loaded upon each tray by a novel overhead loader capable of delivering up to thirty bundles per minute to the conveyor. Empty trays are sensed as they approach the loading device and a bundle delivered to the loading device is dropped upon the desired tray by means of a high speed pusher driven by a servo-motor. The overhead loader accepts bundles from a source delivered to the overhead loader conveyor. A gate limits movement of the delivered bundle and thereby aligns the bundle in readiness for being dispensed. The overhead loader is tilted at an angle to compensate for the tilt in a bundle as it leaves the overhead loader conveyor to assure that each bundle drops squarely upon the desired tray.

Bundles are discharged from a carrier by means of a tilt top which undergoes tilt motion as the tray approaches a discharge chute. The tilt mechanism includes a pair of cam follower wheels, at least one of which rollingly engages a cylinder (or solenoid) operated tilt cam causing a nesting cup of a swingable plate to be initially rotated away from a cooperating locking pin against the force of a torsion spring and thereafter causing the unlocked tray to tilt in the proper direction. Restoring cams respectively engage each of the tilt mechanism cam follower rollers to restore the tilt tray to the upright position and to prevent overshooting. Each tray carrier is provided with only a single vertical wheel and two horizontal wheels arranged at the rearward end of each tray carrier for guiding the carrier along the track, the vertical and horizontal wheels of the upstream carrier serving to provide each carrier with guidance at both the forward and rearward ends.

The bundles are tracked by an electronic tracking technique in which a tag is provided on a master cart which is sensed and which initiates a cart identification procedure. Thereafter, a proximity sensor identifies the passage of each successive cart thereby locating carts as to their position from the master cart. Optional bar code tracking can be utilized, if desired.

Speed control for the system is comprised of a speed sensor utilizing multiple free-wheeling rollers which rollingly engage the bottom surfaces of the carts and are coupled to a sensor for generating pulses representative of conveyor speed. The use of plural interconnected sensor rollers assures that at least two rollers are in engagement with a cart at all times. The feedback information is utilized by a microprocessor based computer, for example, to maintain system speed to an accuracy of within plus or minus five percent ($\pm 5\%$) tolerance relative to the desired speed, to assure proper loading and unloading of bundles from the conveyor.

OBJECTS OF THE INVENTION

It is, therefore, one object of the invention to provide a novel tilt tray conveyor system for product conveyors having a tilt tray mechanism which is initially moved to the unlatched position and thereafter moved to the tilted position responsive to engagement by a selectively operated reciprocating tilting cam.

Still another object of the present invention is to provide a novel tilt tray conveyor system for product conveyors and the like in which the supporting wheels of an adjacent tilt tray carrier cooperating with the supporting wheels of the next succeeding tilt tray carrier provide proper wheel support for each tray carrier, front and rear.

Still another object of the present invention is to provide a novel tilt tray system for product conveyors and the like utilizing a novel drive system in which each tray carrier comprises an integral element of the motor drive.

Still another object of the present invention is to provide a novel tilt tray for product conveyors and the like having a sturdy low profile tilt tray assembly.

Still another object of the present invention is to provide a novel tilt tray system for product conveyors and the like utilizing linear induction motors in a unique manner for propulsion and hence movement of the conveyor.

Still another object of the present invention is to provide novel feedback control means for rollingly engaging the undersurface of each tray assembly to provide a speed indicating signal, the rolling engagement means being designed to assure positive engagement with the bottom surface of at least two of said tray carriers at all times.

Still another object of the present invention is to provide a novel top loader for use in delivering large bundles to moving trays from an overhead position wherein the overhead loader pushes a bundle onto each tray from a conveyor which conveyor is tilted to compensate for any tilt imparted to the bundle thereby assuring that each bundle falls squarely upon the desired tray.

BRIEF DESCRIPTION OF THE FIGURES

The above, as well as other objects of the present invention will become apparent when reading the accompanying description and drawing in which:

FIGS. 2a and 2b show side and end views respectively of a tray assembly according to the present invention;

FIGS. 7a and 7b respectively show side elevation and top plan views of the tip cam assembly;

FIGS. 8a and 8b respectively show side elevation and top plan views of a straightening cam;

FIGS. 10a-10c respectively show side elevation, end elevation and top plan views of the top loader shown in FIG. 1, FIG. 10b being partially sectionalized and looking in the direction of arrows A—A of FIG. 10a;

DETAILED DESCRIPTION OF THE INVENTION

Figure 1:
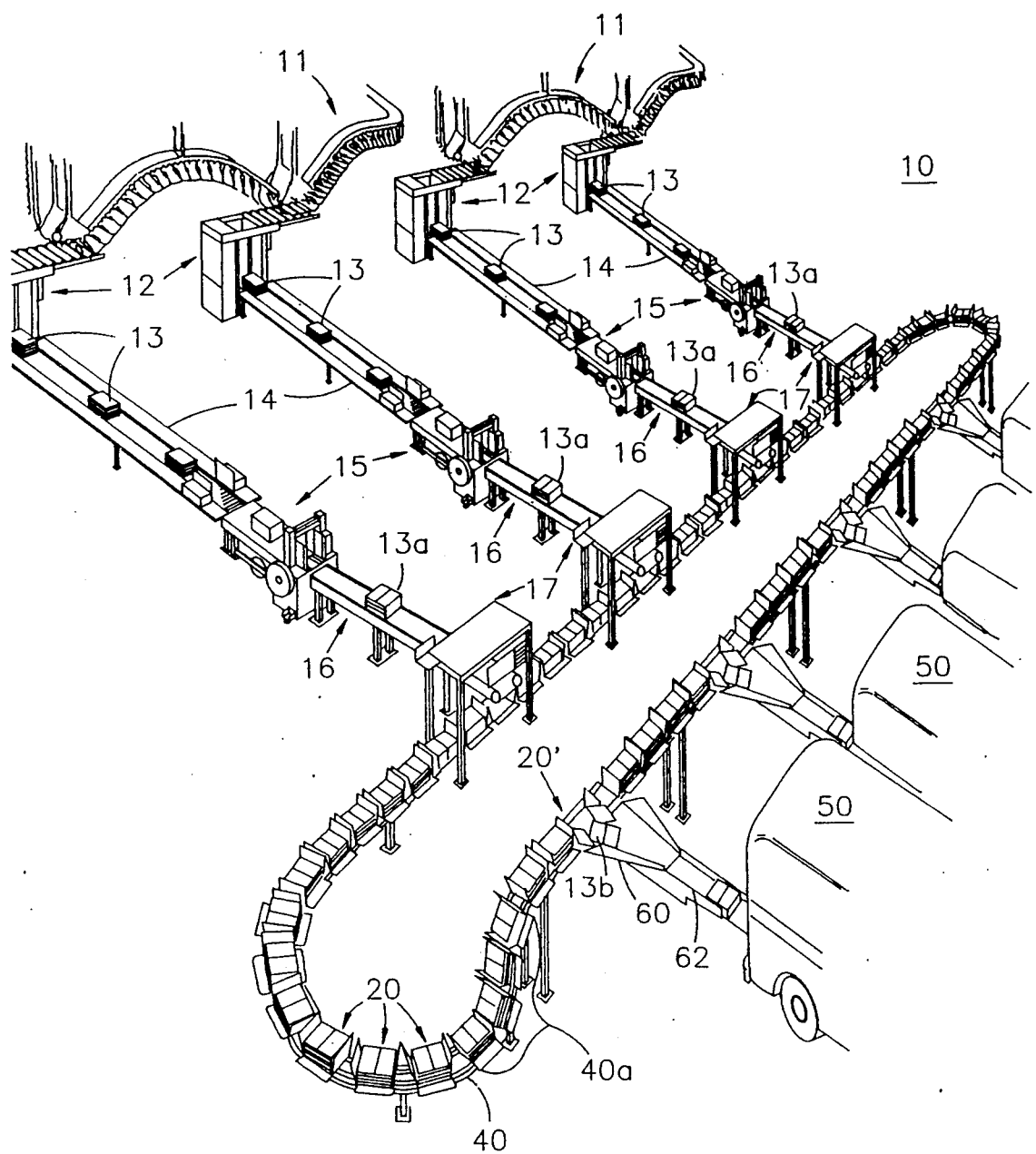
FIG. 1 shows a perspective view of a system employing the product conveyor of the present invention.

FIG. 1 shows an application in which the system of the present invention may be used to great advantage. For example, the integrated arrangement may be comprised of conveyors 11 for delivering signatures from a press to a plurality of signature stackers 12 for stacking the incoming signatures into signature bundles 13 which may be of the compensated or uncompensated type.

Each stacker 12 transfers a completed bundle to an outfeed conveyor 14 for delivery to a tying station 15. Each tied bundle is transferred from the tying station to a conveyor 16 for delivering each completed bundle to an overhead loader 17 which will be more fully described hereinbelow. Each of the overhead loaders is controlled by a computer to precisely drop a completed bundle into the desired tray assembly 20 as it passes beneath the proper overhead loader. The loader conveyor may be used to bypass the overhead load and deliver a bundle to a bypass conveyor as an alternative delivery path to a truck, loading dock or other location.

Each of the tray assemblies 20 is pivotally linked to the adjacent upstream and downstream tray assembly to provide a closed loop product conveyor arrangement wherein each tray assembly serves as a "link" within an elongated, closed loop conveyor "chain" which is continuously recirculated about the loop by linear electric motors arranged at spaced intervals about the loop with the path of the loop being defined by a closed loop track 40 which is arranged to traverse a particular region and to substantially accommodate the contours and configuration of the region. For example, in the network 10 shown in FIG. 1, the application provided therein is deliver predetermined bundles to a predetermined delivery truck 50 under control of a computer system. In order to provide a gravity feed arrangement, the track is provided with an inclined portion 40a to lift the trays and hence the bundles carried thereby to an elevation sufficient to feed a bundle to the desired truck by means of gravity. By computer control, a pneumatic ejector tilts the proper tray assembly, such as, for example, the tray assembly 20' causing the bundle 13b to be dispensed from tray assembly 20' and fall downwardly by gravity along an outfeed chute 60 and thereafter along an outfeed conveyor 62 for delivery directly to the desired truck 50 positioned at the loading dock in alignment with the outfeed conveyor 62.

As will be more fully described, a pair of straightening cams are utilized to return the tilt tray to the upright position preparatory to being returned to the bundle receiving portion of the conveyor "chain" whereby the tray may be loaded with a bundle from any of the overhead loaders, all under control of the computer system for controlling the loading and unloading operations.

FIGS. 2a-2d show a typical tilt tray assembly 20 and the manner in which it is guided by the guide track 40.

Figure 2D:
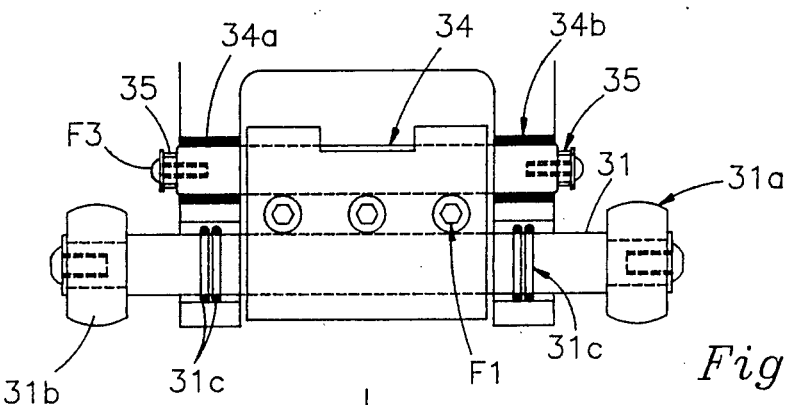
FIG. 2d shows a detailed top view of the tilt assembly shown in FIGS. 2a-2c.
Figure 2B:
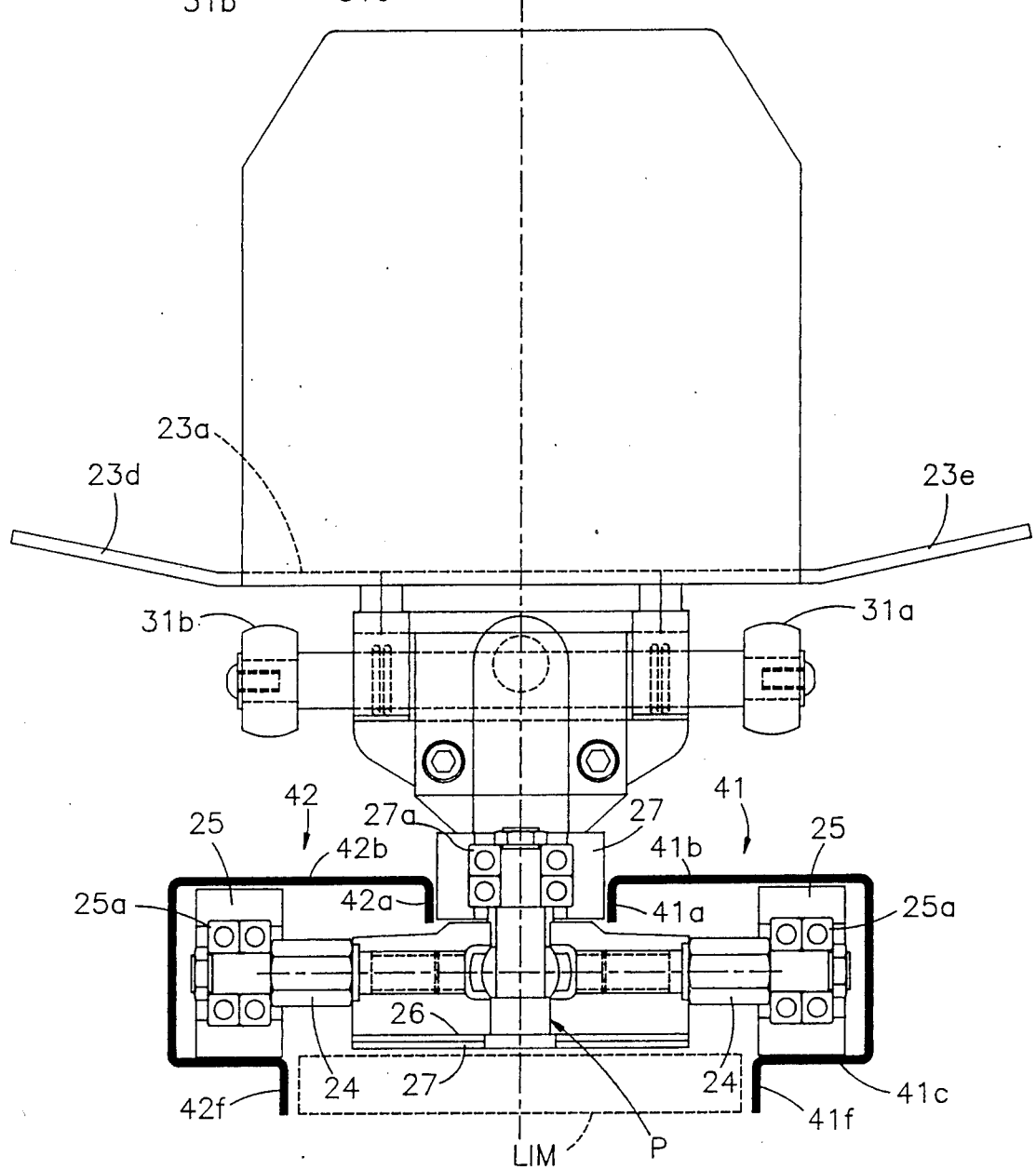
Figure 2C:
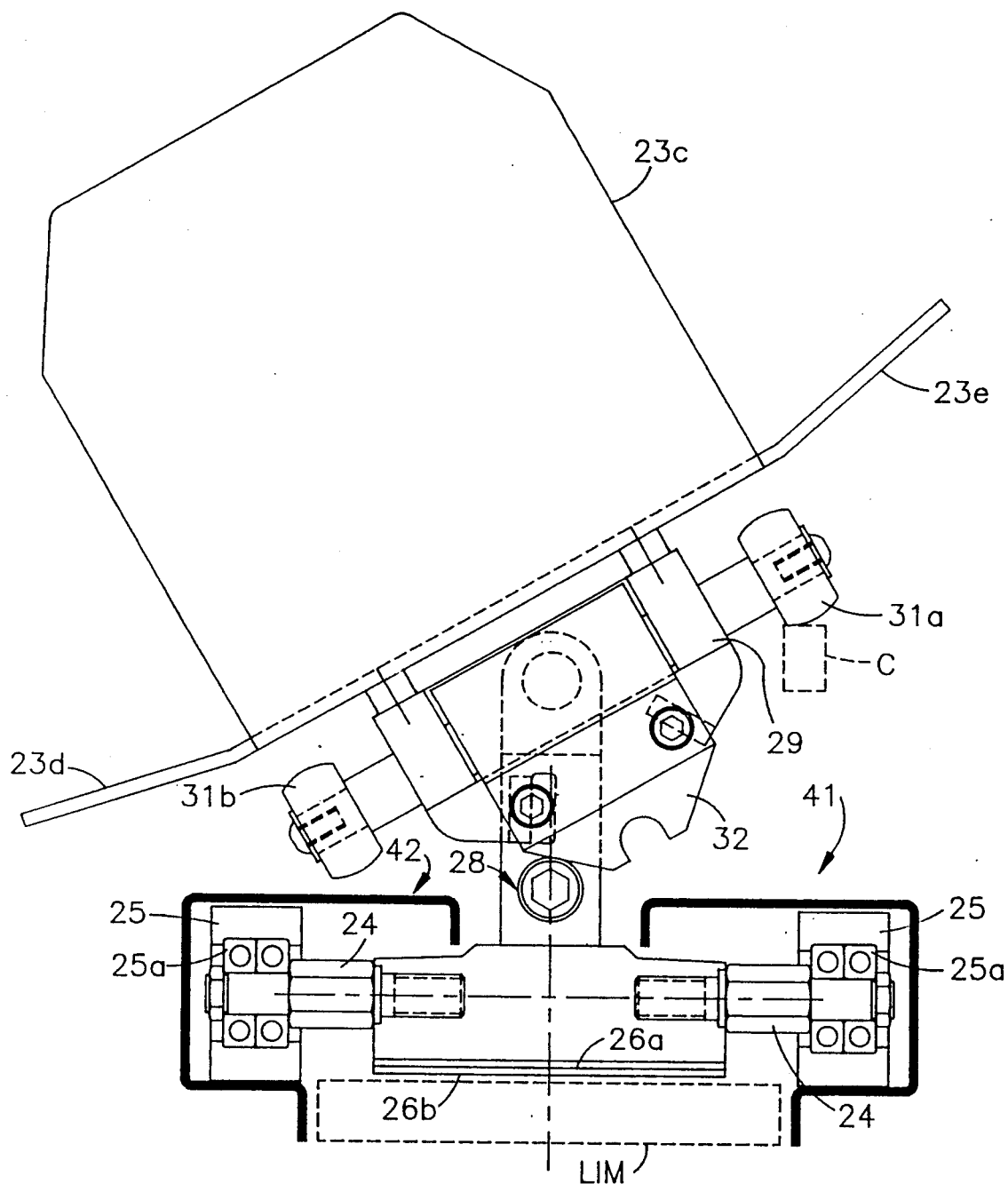
FIG. 2c shows the tray assembly of FIG. 2b in the tilted position.
Figure 3D:
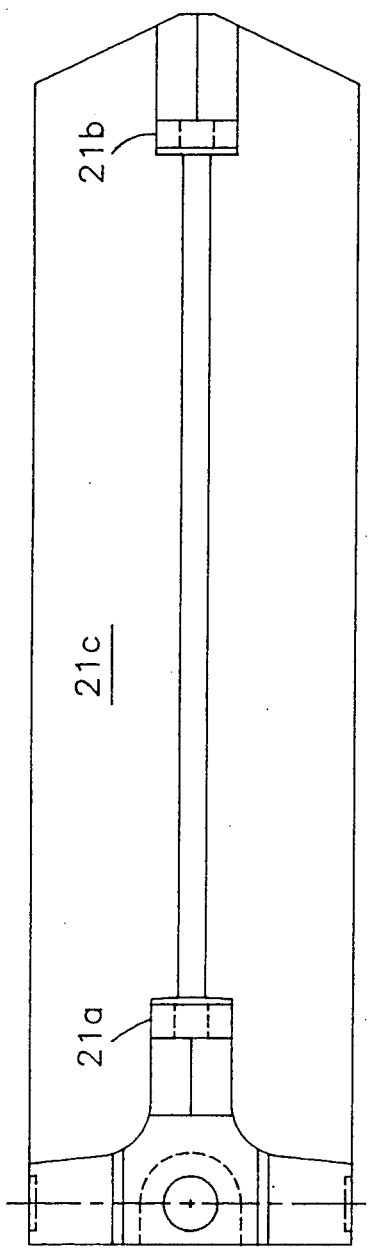
FIGS. 3a-3d respectively show side elevation, front elevation, rear elevation and top plan views of the cart frame of FIGS. 2a-2c.
Figure 3A:
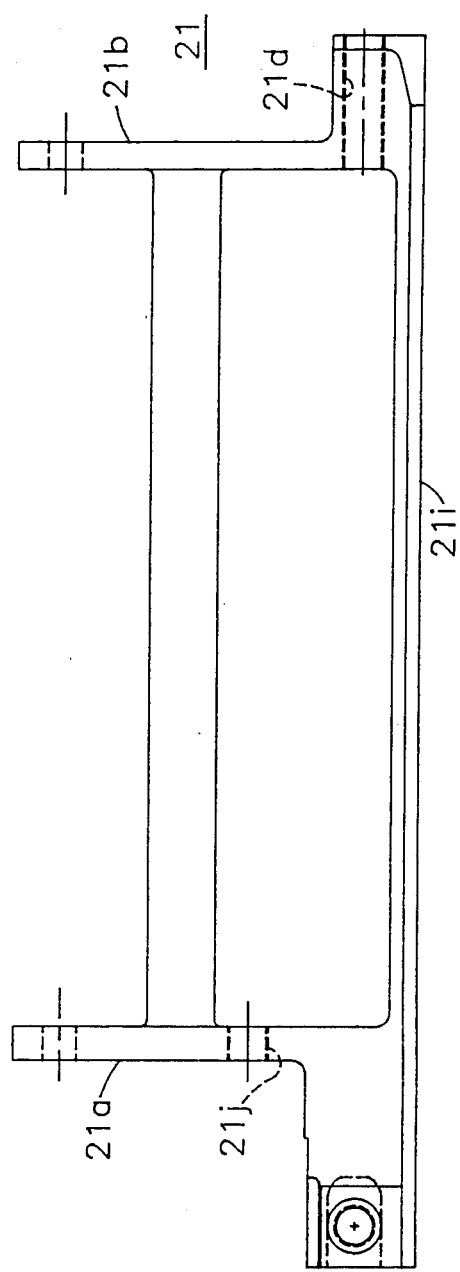
Figure 3B:
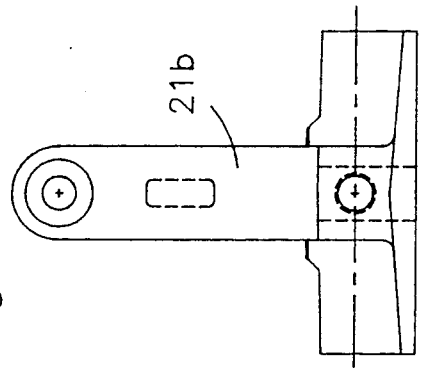
Figure 3C:
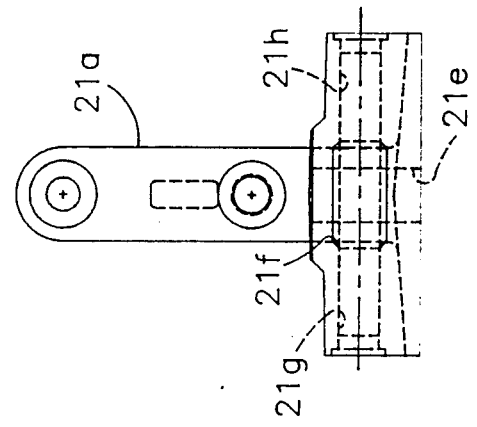

As shown best in FIGS. 2b and 2c, the guide track is comprised of track portions 41 and 42 which are joined to suitable supporting elements (not shown for purposes of simplicity) so that the flanges 41a, 42a cooperate to provide a guide for the vertical roller 27 of the tilt tray assembly which cooperates with the guide flanges 41a and 42a to limit the lateral movement of the tray assembly as it moves along the track.

Upper and lower portions 41b, 41c and 42b, 42c of track portions 41 and 42 form guides for the horizontal rollers of the tilt tray assembly to limit movement of the tilt tray assembly in a direction transverse to the horizontal. As can be appreciated from FIG. 1, the track may be comprised of a plurality of straight portions, curved portions, inclined and downwardly sloping portions of both the straight and curved type, the design of the tilt tray assemblies enabling the conveyor to navigate around horizontal curves as small as six (6) feet in radius, vertical curves as small as ten (10) feet in radius, and inclination angles of up to 30°. The track sections are preferably formed of a suitable metallic material to provide a rugged and highly serviceable track.

Each tilt tray assembly 20 is comprised of a one-piece frame 21 shown in detail in FIGS. 3a-3d and comprised of a base portion 21c provided with forward and rearward uprights 21b, 21a having openings whose centerlines are horizontally aligned for supporting a shaft 22 for swingably mounting the tilt tray 23.

Tilt tray 23 is comprised of a substantially flat base portion 23a having integral forward and rearward sides 23b, 23c which form an angle slightly greater than 90° with base portion 23a. Left and right-hand sides 23d, 23e form an angle of just slightly less than 180° with base portion 23a. Forward and rearward sides 23b, 23c serve to retain a bundle therebetween to a much greater degree than sides 23d and 23e which are designed to facilitate the dispensing of a bundle when the tilt tray is tilted from the upright position shown in FIG. 2b to the tilted position shown in FIG. 2c, to facilitate the delivery of a bundle at an outfeed chute location 60, shown for example, in FIG. 1.

The forward end of frame 21 extends forwardly beyond upright 21b and is provided with a threaded opening 21d for receiving a ball and socket assembly comprised of threaded member 24 having a circular "socket" portion 24a for rotatably supporting the ball member 24b having an opening 24c adapted to receive a pin provided at the rearward end of the tilt tray assembly positioned immediately in front of tilt tray assembly 20 shown, for example, in FIG. 2a. This pin is shown, for example, as pin P arranged within the vertically aligned opening 21e provided in the portion of frame 21 extending rearwardly of rear upright 21a (see FIG. 2b). The central portion of opening 21e in the frame is enlarged as shown at 21f to receive the ball and socket assembly of the tilt tray assembly 20 shown in FIG. 2a, for example.

The rearward end of frame 21 is further provided with horizontally aligned threaded openings 21g, 21h which receive and threadedly engage the threaded portions of a pair of axle pins 24, 24 which serve to rotatably mount the wheels 25, 25 which rotate about the wheel bearings 25a, 25a.

The bottom surface 21i of frame 21 is provided with a cold rolled steel plate 26a and an aluminum plate 26b respectively laminated to the bottom surface thereof and cooperating with the linear motor (to be more fully described) to set up the proper eddy current paths for propelling the tilt tray assembly.

As was mentioned hereinabove, vertical pin P, in addition to extending through the hollow opening 24c in ball member 24, further rollingly supports vertical wheel 27 having bearings 27a for rotation about the pin P.

Figure 4C:
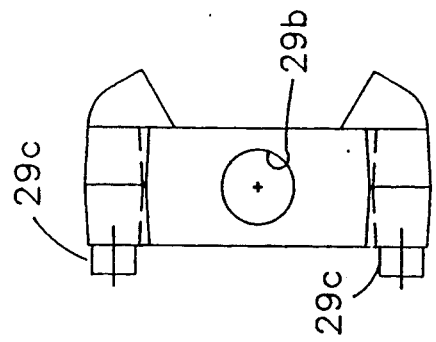
FIGS. 4a-4c respectively show top, side elevation and front views respectively of the tip frame of FIGS. 2a-2c.
Figure 4A:
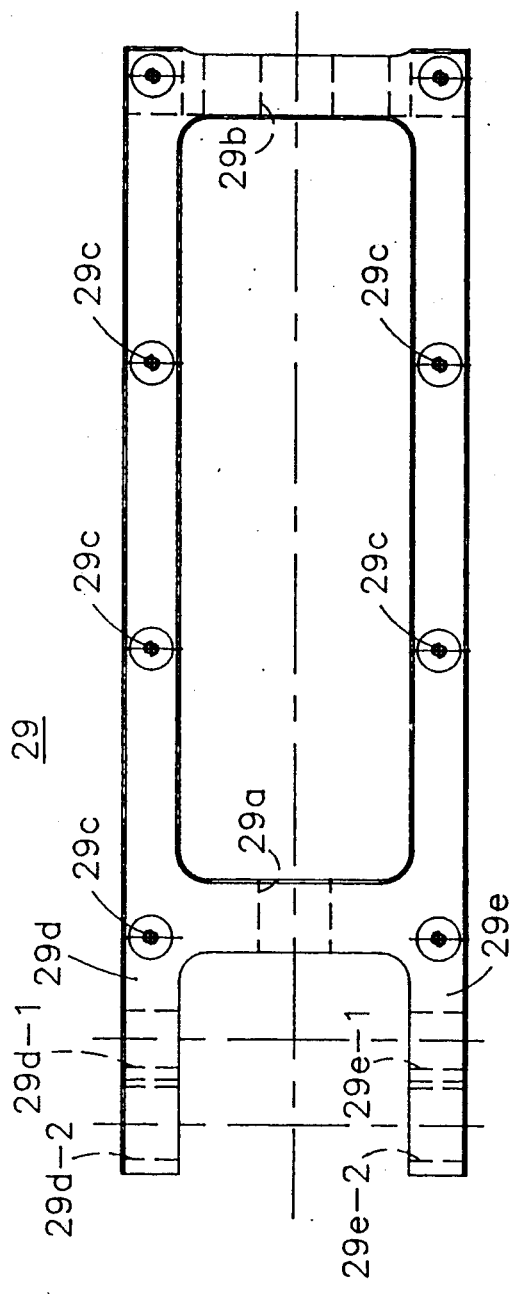
Figure 4B:
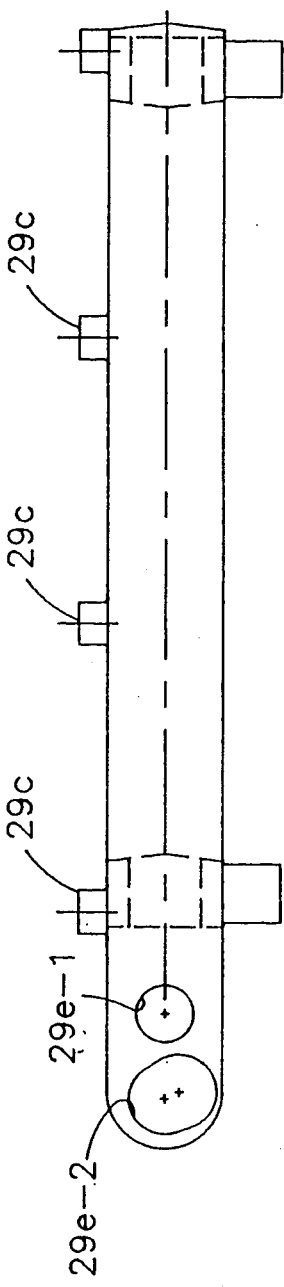

The tilt assembly TA is comprised of a threaded locking pin 28 threadedly engaging tapped opening 21j in frame 21. A tip frame 29 shown in FIGS. 4a, 4b and 4c is a substantially rectangular-shaped frame having openings 29a, 29b for receiving and being swingably mounted upon shaft 22 which is rigidly secured to uprights 21b, 21a by fasteners F, F. Tip frame 29 is provided with tapped openings 29c for threadedly receiving suitable fasteners to secure tray 23 thereto.

Figure 5B:
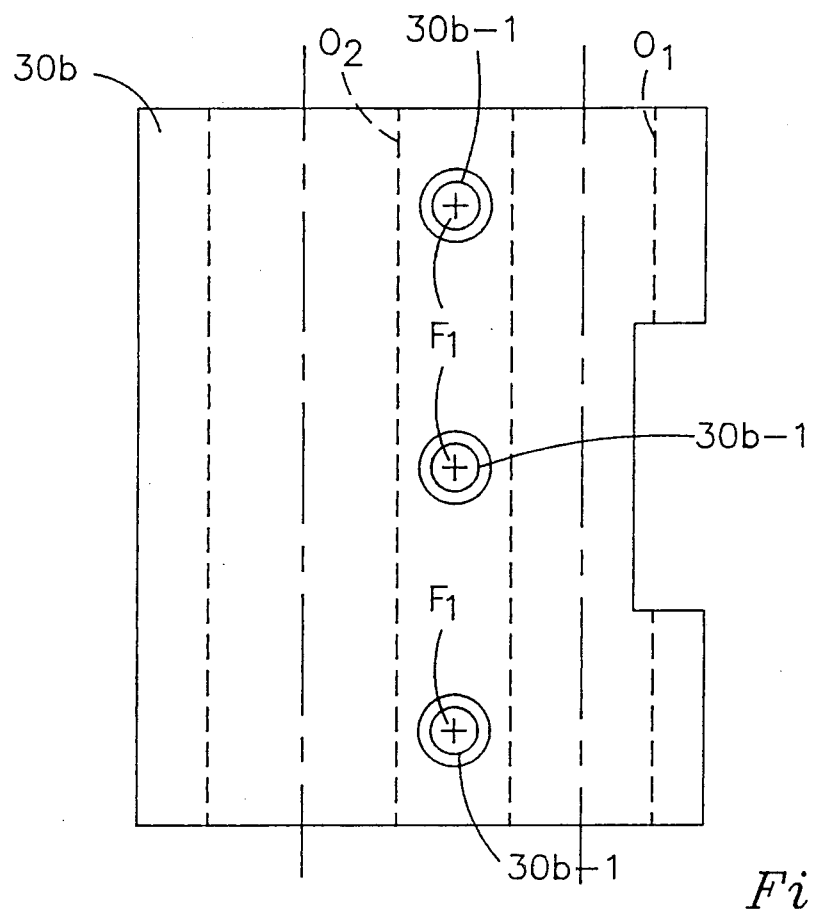
FIGS. 5a and 5b respectively show side elevation and top views of the latch block employed in the tilting assembly of FIGS. 2a-2c.
Figure 5A:
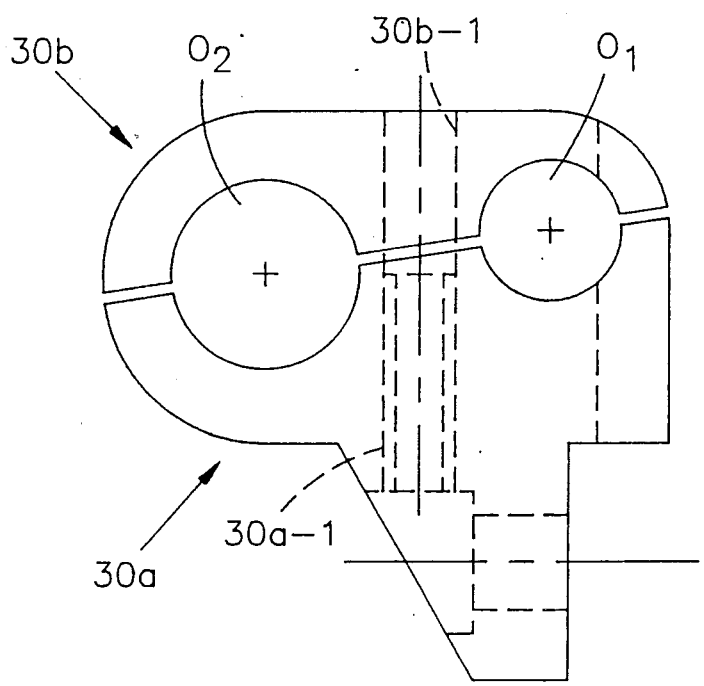
Figure 6:
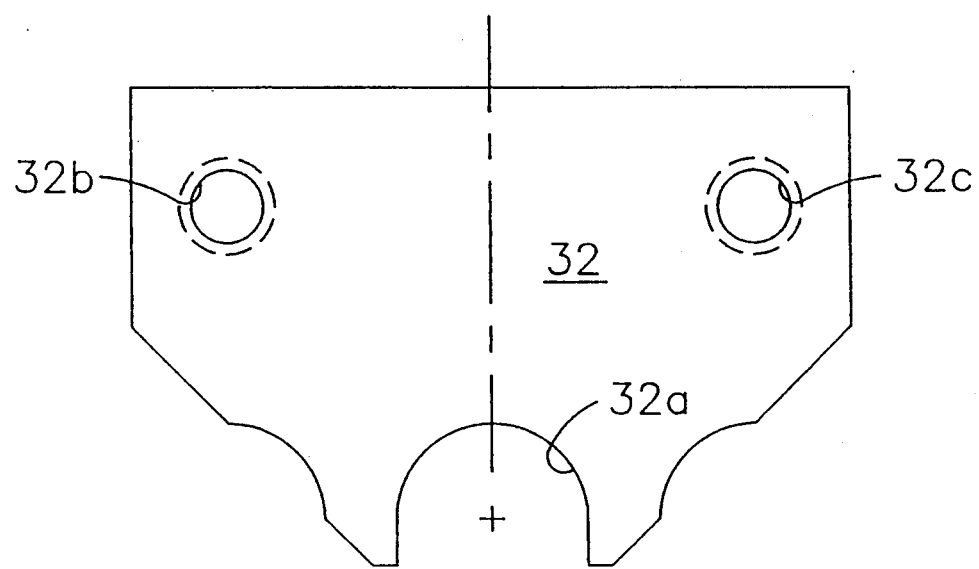
FIG. 6 shows a plan view of the latch plate forming part of the tilting assembly of FIGS. 2a-2c.

Frame 29 has a pair of projections 29d, 29e which extend rearwardly and are positioned on opposite sides of the frame upright 21a. A latch block 30 forming part of the tilt assembly and shown in detail in FIGS. 5a and 5b is comprised of latch block lower and upper halves 30a, 30b secured to one another by means of fasteners F1 extending through openings 30b-1 in upper block 30b and threadedly engaging one of the tapped openings 30a-1 in lower block portion 30a. The blocks are machined or otherwise formed with semi-circular portions so that when they are joined together in the manner shown, for example, in FIGS. 2a and 5a, they define openings O1 and O2. Opening O1 is coincident with the openings 29d-1, 29e-1 in rearward projections 29d and 29e of tip frame 29. The central axes of these openings serve as a pivot axis for the latch block 30 and latch plate 32. Larger opening O2 is substantially aligned with the elongated openings 29d-2, 29e-2 provided in rearward projections 29d and 29e of tip frame 29.

Elongated shaft 31 extends through openings O2, 29d-2 and 29e-2 as shown best, for example, in FIGS. 2a-2e. Cam follower rollers 31a, 31b are rotatably mounted at the opposite ends of shaft 31. The intermediate portion of shaft 31 extends through opening O2 and is tightly clamped between the latch block halves 30a and 30b. Resilient O-rings 31c prevent metal-to-metal contact between shaft 31 and the interior surfaces of the elongated openings 29d-2 and 29e-2.

A latch plate 32 having a substantially semi-circular-shaped slot 32a for embracing locking pin 28, is provided with a pair of tapped openings 32b, 32c for threadedly engaging fasteners F2 for securing latch plate 32 to the lower half 30a of latch block 30.

A shaft 34 extends through opening O1 in latch block 30 and openings 29d-1 and 29e-1 in tip frame 29. The latch block halves are clamped together to rigidly secure the latch block to shaft 34 which is free to rotate within the openings 29d-1, 29e-1 by suitable bearings 34a, 34b. At least one torsion spring 35 is wrapped about shaft 34 near roller 31b. If desired, a second torsion spring may be provided adjacent the roller 31a. The spring is preferably wrapped about two (2) to four (4) turns about shaft 34. One end of torsion spring 35 rests against the lower rear edge of tray 23 and the other end rests against an adjacent portion of shaft 31, the torsion spring normally urging the tilt assembly in the counter-clockwise direction about shaft 34 relative to FIG. 2a so as to normally urge and position latch plate 32 against the rearward surface of upright 21c in the manner shown in FIG. 2a in order to embrace locking pin 28. The torsion spring 35 also further serves to normally orient the tip frame and tray in the upright position, especially when two such springs are provided.

When one of the rollers, such as for example, the right-hand cam follower roller 31a is urged upwardly from the position shown in FIG. 2b toward the position shown in FIG. 2c by an opening cam surface C shown in dotted fashion in FIG. 2c, the initial upward movement of the cam follower roller 31a causes latch block 32 to rotate clockwise (relative to FIG. 2a) about pivot pin 34, moving latch plate 32 away from latch pin 28. As soon as the latch plate cup 32a clears latch pin 28, the tip frame and tray are free to tilt about mounting shaft 30, moving the tip frame 29, tilting assembly 27 and tray 23 counterclockwise about shaft 30 (relative to FIG. 2b) to move the tip frame and tray from the position shown in FIG. 2b to the position shown in FIG. 2c. The angle of the tilt tray shown in FIG. 2c is sufficient to cause a bundle riding therein, such as a signature bundle, to be dispensed therefrom. The angle of the tray, together with the rapid movement of the tip frame and tray from the position shown in FIG. 2b to the position shown in FIG. 2c, cooperate to drop the signature bundle carried thereon to an outfeed chute, such as, for example, any of the chutes 60 shown in FIG. 1.

As an alternative arrangement, there may be a reversal of parts whereby latch plate 32 may be provided with a pin, and upright frame 21a may be provided with an opening for receiving the pin, said reversal of parts providing substantially the same operation as the arrangement shown, for example, in FIGS. 2a.

As will be described more fully hereinbelow, a pair of restoring or straightening cams, arranged on opposite sides of the centerline of movement of the tilt tray assemblies engageable by the cam follower rollers 31a, 31b, cause the tilt tray to be moved to and retained in the upright position. The use of a pair of restoring cams, in addition to restoring the tilt tray to its upright position, prevents overshooting of the tilt tray from the tilted position to a position beyond the upright position. Upon return to the upright position, the latch plate cup 32a moves into alignment with latch pin 28 causing the cup to embrace the latch pin under the force of torsion spring 35 and causing the latch plate to be urged against the rear surface of upright 21a to return the tipping assembly to the latched position. The tray assembly will remain in the upright position indefinitely and until tipped therefrom by a tipping cam.

As shown in FIG. 2a, a linear electric motor having a length and width which is substantially equal to the length and width of the bottom surface of frame 21, is secured to the guide track frame, in the region between flanges 41f and 42f as shown best in FIG. 2b and is spaced a very small distance away from the bottom surface of the laminated plates arranged upon the bottom surface of frame 21. The linear electric motor, which may be of the single-sided type produced by Northern Magnetics, Inc. of Van Nuys, CA, is preferably a three-phase linear motor spaced from the bottom surface of plate 27 to provide an air gap of the order of 0.09 inches. The three phase linear motor sets up electromagnetic fields which create eddy currents in the laminated plates secured to the bottom of frame 21 developing a thrust which causes the tray assembly to move in the forward direction as shown by arrow A in FIG. 2a. The thrust of the motor is sufficient to propel the tray assemblies by providing LIMs at regularly spaced intervals about the closed loop path. For example, employing the LIMs of the type described hereinabove, a plurality of such LIMs spaced at distances of the order of fifty foot intervals have been found to be more than adequate to provide the desired operating speed, which in one preferred embodiment is of the order of 3.7 miles per hour having the capability of delivering a 175 bundles per minute at the aforementioned operating speed. The actual spacing, however, is a function of the inclines, curves and other path shapes as well as the bundle weight and may vary dependent upon these factors.

The linear motor is further provided with blower means B for maintaining the linear motor at a desired operating temperature, as is conventional.

The tray assemblies are conveyed about the closed loop track without any direct mechanical connection whatsoever between the drive motors (LIMs) and the tray assemblies.

Figure 9A:
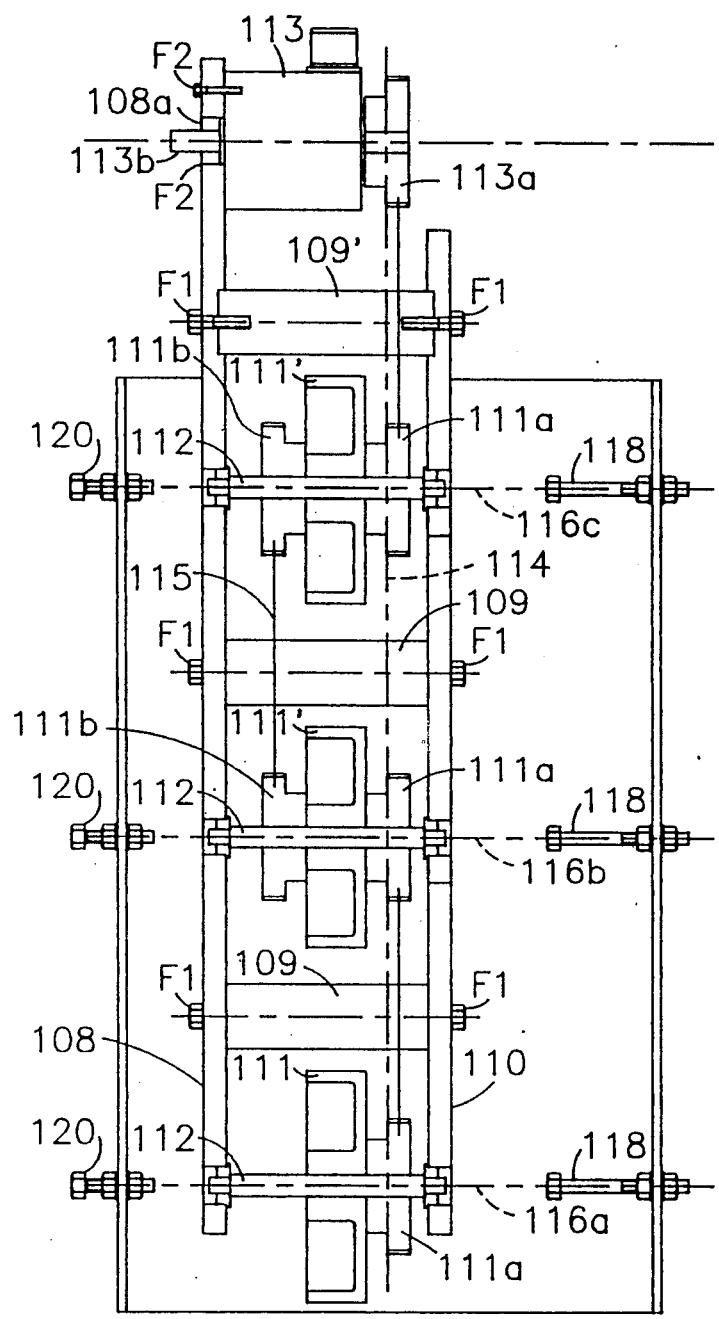
FIGS. 9a and 9b respectively show top plan and end elevation views of the sensor assembly employed in FIG. 9, FIG. 9a being a sectional view of the assembly of FIG. 9b looking in a direction of arrows A—A.
Figure 9B:
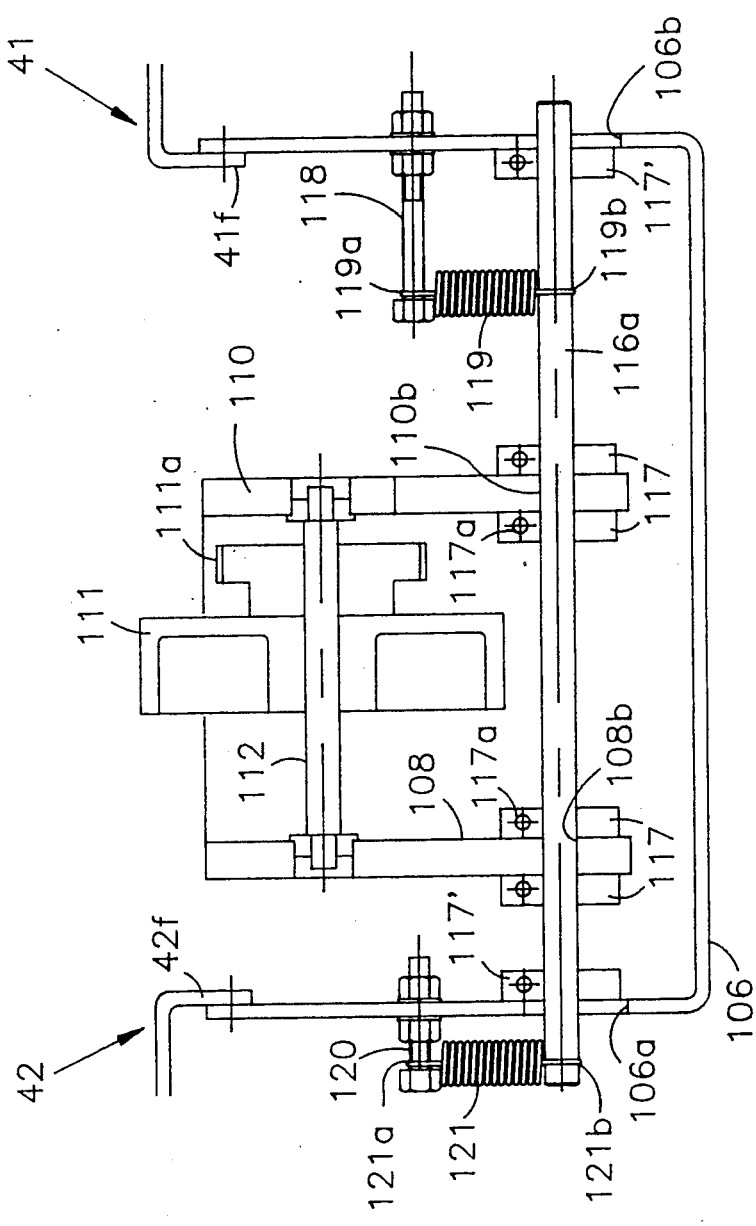
Figure 9C:
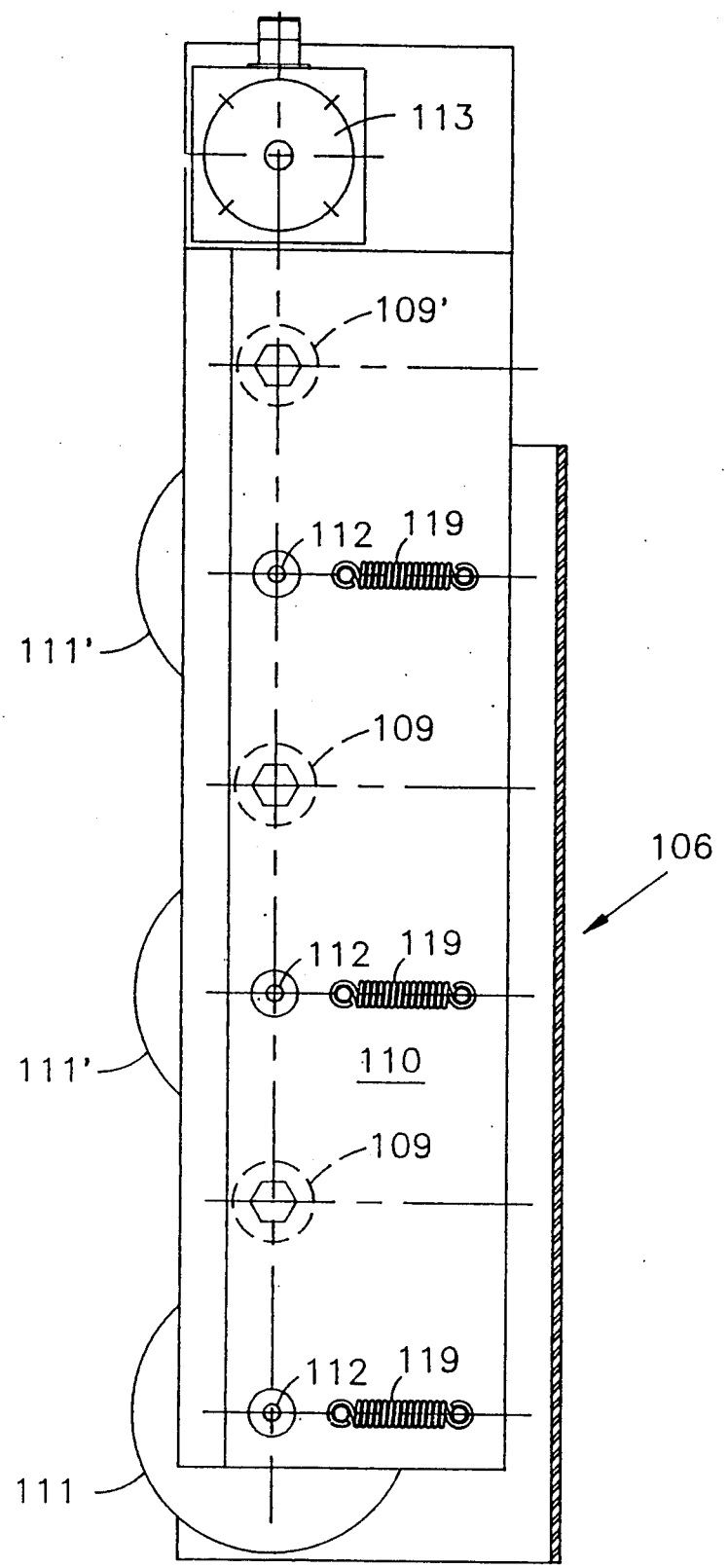
FIGS. 9c-9e are sectional views respectively looking in the direction of arrows B—B (FIG. 9a), C—C (FIG. 9a) and D—D (FIG. 9b)
Figure 9D:
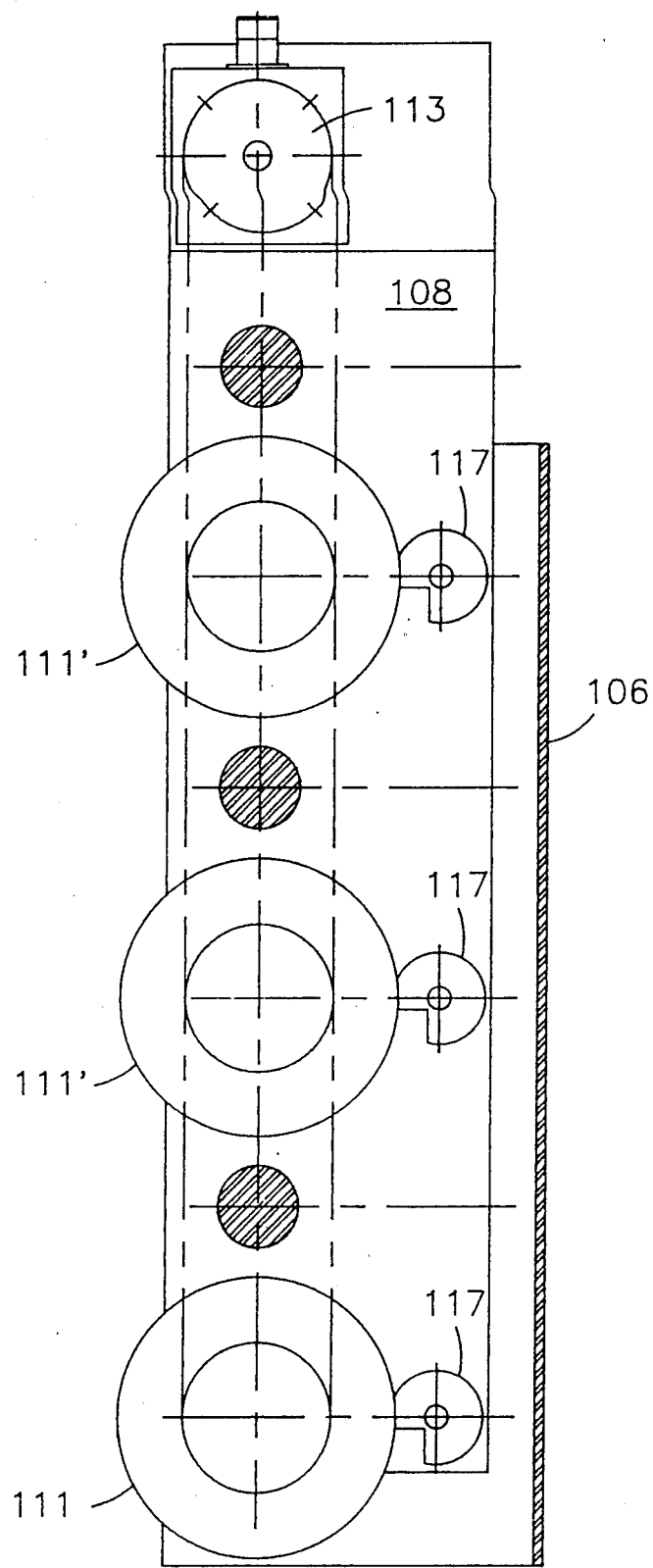
Figure 9E:
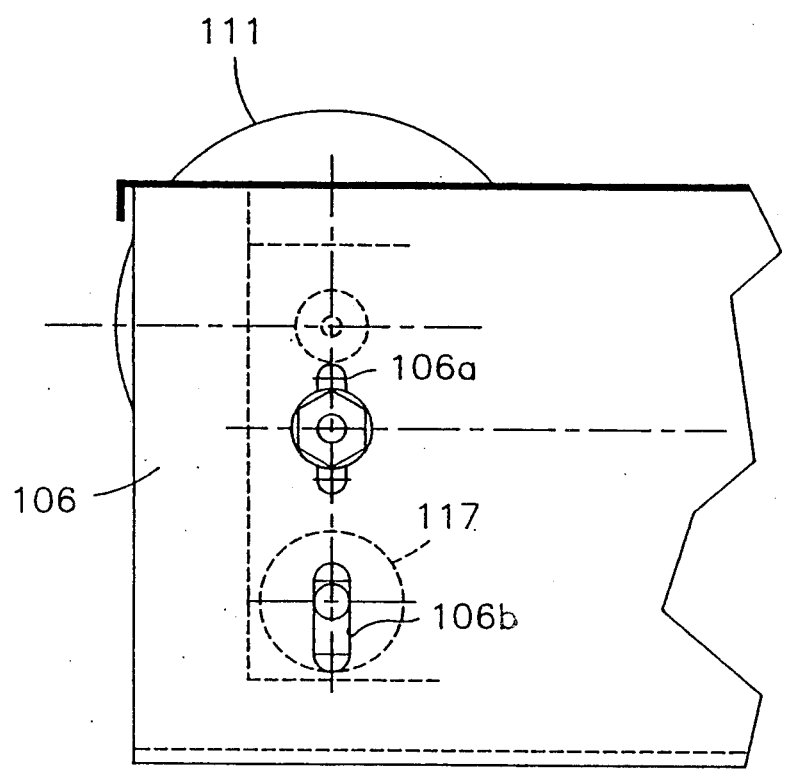
Figure 9:
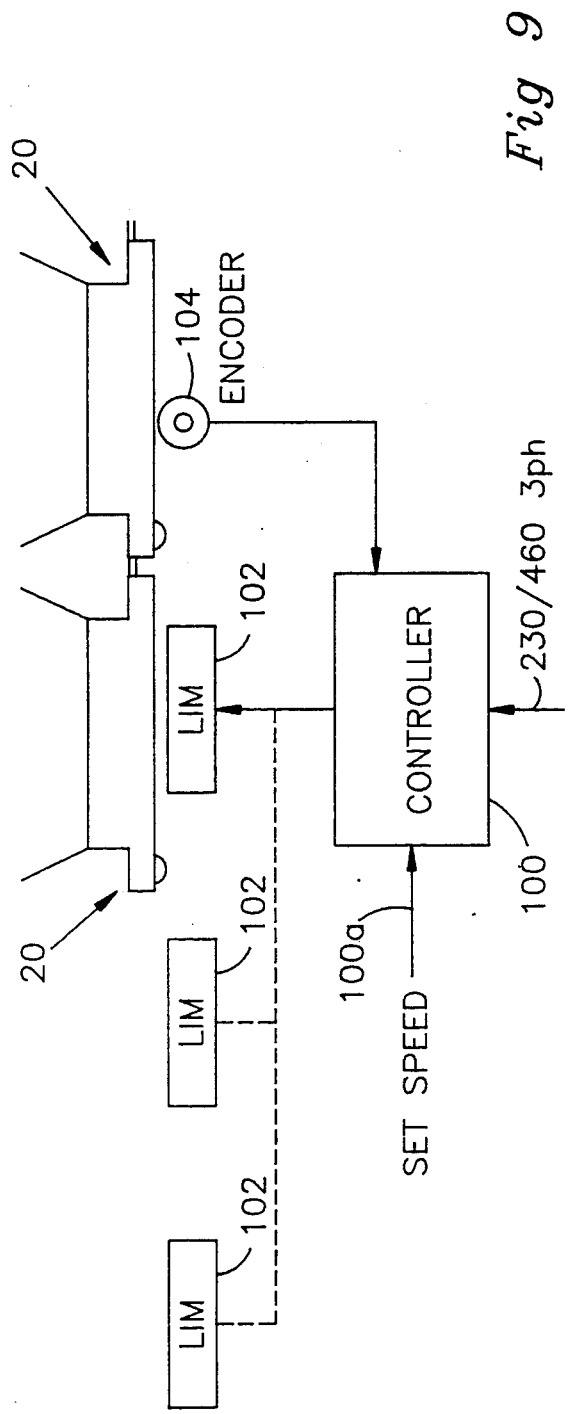
FIG. 9 shows a block diagram of the speed control system employed in the present invention.

FIG. 9 shows a simplified view of the manner in which the operating speed is controlled, as will be more fully described.

Figure 7C:
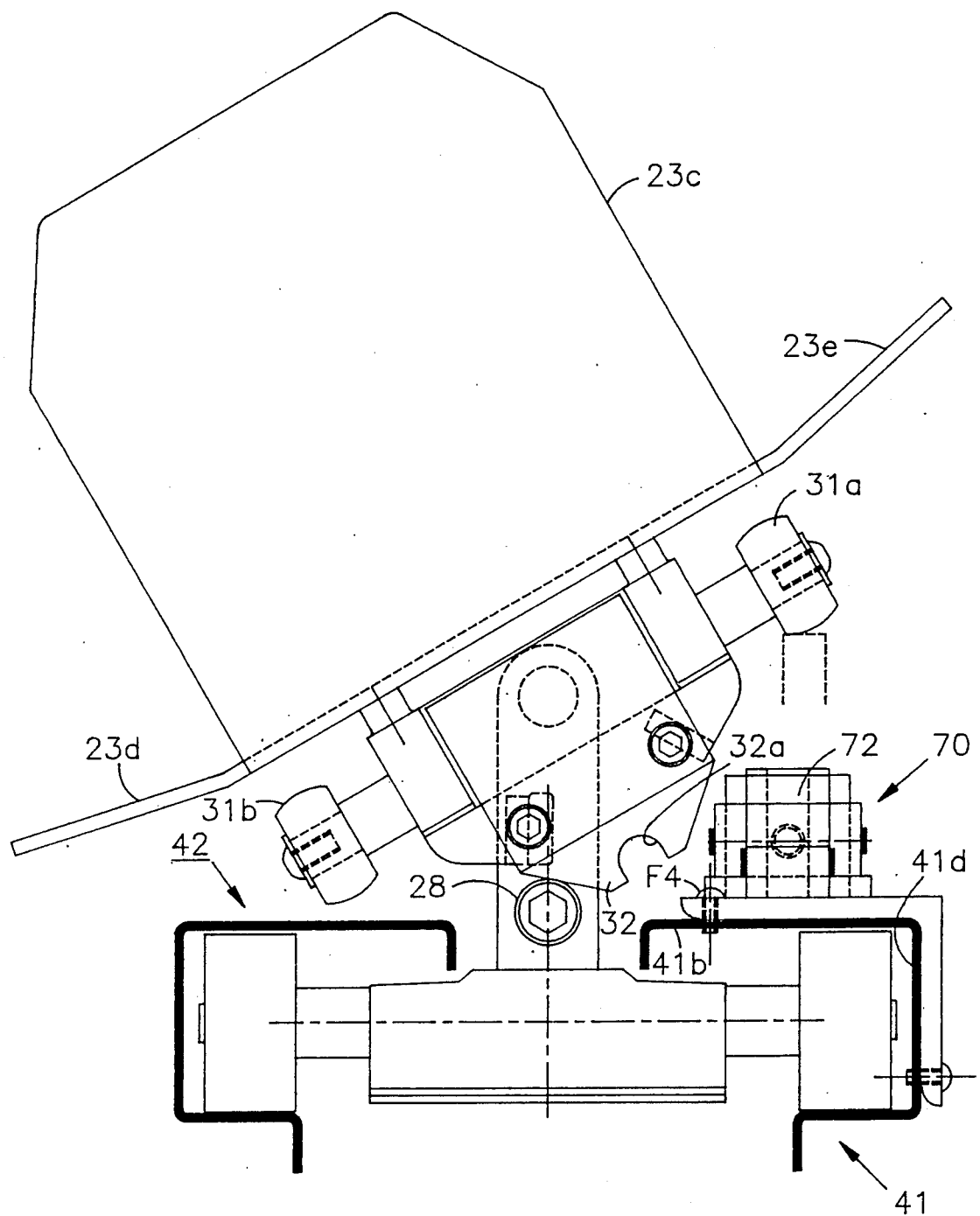
FIG. 7c shows the manner in which the tip cam assembly of FIGS. 7a and 7b performs a tilting operation upon a tilting assembly.

The FIGS. 7a-7c show the tip cam assembly referred to hereinabove, for tilting the tiltable tray assembly. The tip cam assembly 70 is comprised of an L bracket 71 for mounting the tip cam assembly to one of the guide tracks and, as shown in FIG. 7c, specifically guide track 41. Fasteners F3 secure the vertical arm of bracket 71 to one vertical side 41d of track 41 while the horizontal arm of L bracket 71 is secured to the horizontal surface 41b of track member 41 by fasteners F4. The tip cam assembly is further comprised of a ramp member 72 secured to the horizontal arm or bracket 71 by fasteners F5 and having an inclined cam surface 72c. The pivot ramp is further provided with a pair of bifurcated arms 72a, 72b each provided with an opening for receiving a mounting pin 73a extending through an opening in elongated tip cam 73 whose opening is provided in a downwardly depending forward portion 73b. Tip cam 73 is coupled to a pair of links 74, 74 by means of pin 75. The opposite ends of the links 74, 74 are coupled to pin 76 which extends through a pair of slider yokes 77, 77. A pair of slider blocks 78, 78 are slidably arranged within the elongated slots 77a, 77a of the associated slider yokes 77, 77. The tip cylinder 79 is secured to a mounting block 80 by means of pin 81 which is coupled to the clevis 79a provided at the right-hand end of cylinder 79. Mounting block 80 is secured to the horizontal portion of mounting bracket 71 by fasteners F7.

The cylinder piston 79b extends outwardly from the cylinder and to the left and is provided with a mounting eyelet 79c having an opening for receiving pin 76.

Cylinder 79 is a pneumatic cylinder provided with control ports 79d, 79e. Assuming the tip cam assembly to be in the off condition with tip cam 73 in the solid line position, and assuming that the next tilt tray assembly is to be tilted, pneumatic pressure is applied to port 79e driving piston 79b to the left. This movement is imparted to the links 74, 74 which lift tip cam 73 from the solid line position to the phantom line position 73'. Phantom circles 31a, 31a', 31a'' show the progress of the tip cam follower roller 31a. The ramp surface 72c provided along ramp member 72 assures gradual movement of a roller onto the cam surface of the tip cam in the event that there is any misalignment of the cam follower rollers to prevent the cam follower rollers and hence the tip cam assembly from experiencing any sudden jolt or impact as a cam follower roller moves, approaches and engages the tip cam assembly.

The tip cam assembly may be rapidly reset by applying pneumatic pressure to port 79d to thereby abruptly move the tip cam from the phantom line position 73' to the solid line position 73 in order to prevent the tilting of a tilt tray assembly which is not intended to be unloaded at the output chute location. Tip cam assemblies of the type shown as assembly 70 in FIGS. 7a–7c are provided at a location slightly upstream relative to each output chute 60 in order to selectively tilt the desired tilt tray assembly.

It should be noted that each tilt tray assembly is capable of being tilted either in the clockwise direction or in the counterclockwise direction (relative to FIG. 7c, for example) and further that the output chutes may be placed on either side of the closed loop track enabling unloading of a signature bundle to an outfeed location on either side of the closed loop track. Thus, by placing a tip cam assembly on the opposite side of the track assembly, i.e. by mounting a tip cam assembly to the track portion 42 shown in FIG. 7c, the tilt tray may be tilted in the clockwise direction relative to FIG. 7c, the side upon which the dispensing of bundles is to take place being dependent only upon the needs of the user.

Figure 8C:
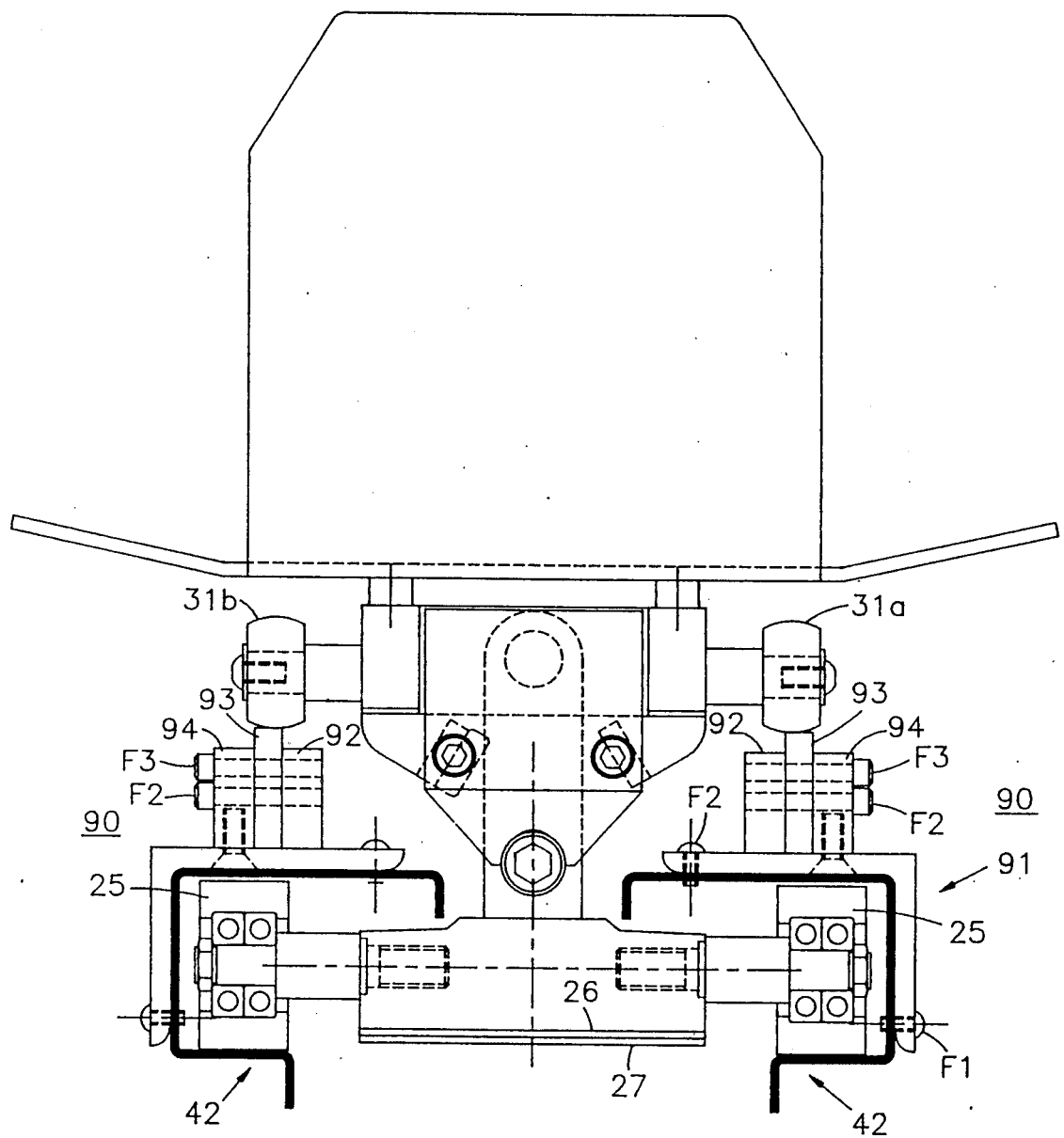
FIG. 8c shows the manner in which two straightening cams are arranged to align a tilt tray assembly in the upright position.

FIGS. 8a–8c show the tray straightener cam assemblies 90, 90, there being a tray straightener cam assembly mounted to each track half 41, 42 as shown in FIG. 8c. Since the tray straightener cam assemblies are substantially identical and are actually symmetrical to one another, these assemblies have been identified by like numerals.

Each assembly is comprised of an L-shaped mounting bracket 91 whose vertical arm is secured to an associated one of the track portions by fasteners F1 while the horizontal arm is coupled to one of the track sections by fasteners F2. A straightener cam 92 is provided with a ramp portion 92a which slopes upwardly in the direction of movement of the tip cam follower roller 31a and, after reaching a peak at 92b, has a downward sloping portion 92c. A cam mount 93 cooperates with cam 92 for positioning a slidable cam 94. Cam mount 93 has a tapered portion 93a which can be seen to be coplanar with an upper portion of the sloping portion 92a of cam 92. At a peak 93b which is in alignment with the peak 92b of cam 92, cam mount 93 has a downwardly sloping portion 93c which is coplanar with the downwardly sloping portion 92c of cam 92.

Adjustable cam member 94 is provided with a pair of elongated slots 94a, 94b through which the fasteners F2 and F3 extend, fasteners F2 and F3 being threaded at their free ends to threadedly engage tapped apertures 92d, 92e in cam member 92. Adjustable cam 94 has an upwardly sloping surface portion 94c and a downwardly sloping portion 94d, these portions being substantially coplanar with the upwardly sloping portions 92a, 93a, and the downwardly sloping portions 92c, 93c. Adjustable cam 94 is slidable either downwardly and to the left or upwardly and to the right to extend the upward sloping portion in order to adjust the tray straightener assemblies to compensate for any deviations from the normal spacings between the cam follower rollers and the cam straightener assemblies.

Noting FIG. 8c, a pair of cam straightener assemblies are provided for cooperation with each cam follower roller 31a, 31b regardless of the direction in which the tray is tilted for the reason that the provision of two cam straighteners each cooperating with the associated cam follower rollers prevents the tilting assembly from overshooting the desired upright position, regardless of the direction in which the tray has been tilted.

The tray straightener cam assemblies are mounted just downstream from each output chute in order to straighten each tilt tray assembly as it passes the tray straightener cam assembly.

As was mentioned hereinabove, the linear motors are controlled to accurately regulate the speed of the tilt tray assemblies in order to accurately dispense bundles from each of the outlet chute locations, as well as being capable of operating the loader which loads bundles onto the tilt tray assemblies, the operation of the loaders also being dependent upon accurate control of the speed of the tilt tray assemblies.

The manner in which the desired control is obtained is by way of a feedback arrangement shown in FIG. 9 comprised of a controller 100 for controlling the current to each of the LIMs. A speed setting input 100a receives the desired speed. For example, a touch screen may be employed for inputting the desired speed and for displaying the desired speed which has been inputted. Controller 100 is coupled to encoder 104 which provides a feedback signal of the conveyor speed which is continuously compared against the set speed for regulating the amplitude of the three-phase current applied to each of the linear motors 102.

Encoder 104 is comprised of an encoder assembly shown best in FIGS. 9a–9f and includes a substantially U-shaped encoder support 106 coupled to the downwardly depending flange portions of the track sections 42 and 41 shown best in FIG. 9b. A pair of plates 108, 110 are secured together in spaced parallel fashion by means of spacers 109 arranged between the plates and set within shallow circular recesses provided in the plates as shown in the vicinity of the uppermost spacer 109' shown in FIG. 9a. The spacers are secured to plates 108 and 110 by fasteners F1. Three tires 111, which are substantially identical to one another, are mounted to rotate upon shafts 112 journaled within bearings arranged within the plates 108 and 110. Each tire 111 has an integral gear member 111a while the uppermost tires 111' are further provided with left-hand integral gear members 111b. An encoder 113 is fixedly secured to left-hand plate 108 by fasteners F2. Encoder 113 is provided with a similar gear or sprocket 113a extending to the right of the encoder housing. The shaft upon which the sprocket is mounted extends through a clearance opening 108a provided in plate 108.

Encoder 113 is designed to provide an electrical signal representative of the rotational speed developed by the encoder shaft 113b which is coupled to the right-hand gears 111a by means of a common timing belt 114 shown in dotted fashion. The tire assemblies 111' also have their left-hand gears coupled in common by a single timing belt 115.

Three shafts 116a, 116b, 116c shown in dotted fashion in FIG. 9a and shown in solid line fashion in FIGS. 9b through 9e, extend through cooperating openings, such as, for example, the openings 108b, 110b provided in plates 108 and 110. Clamp collars 117 orient plates 108 and 110 relative to the shafts 116a, 116c, each clamp collar further including a threaded fastener 117a as shown in FIG. 9b for rigidly securing each clamp collar to its associated shaft and for further clamping plates 108 and 110 between each associated pair of clamp collars.

Each of the shafts 116a–116c have their left and right-hand ends extending through elongated slots 106a, 106b provided in the vertical sides of support 106. Clamp collars 117' fixedly secure the shafts against movement in the direction of their longitudinal axis while at the same time permitting each of the shafts to move vertically up or down within the elongated slots. Note, for example, slot 106b shown in FIG. 9e.

A plurality of mounting pin assemblies 18 are secured to the right-hand vertical side of support 106 and each of said assemblies, at their free ends support the upper end 119a of a helical spring 119 whose lower end 119b embraces an associated one of said shafts 116a-116c. A plurality of somewhat similar pin assemblies 120 are fixedly secured to the left-hand vertical side of support 106 and, in a similar fashion, each supports the upper end 121a of a helical spring 121 whose lower end 121b is wrapped about the left-hand end of an associated one of the shafts 116a-116c. Each of the shafts is preferably provided with an annular groove for receiving and retaining the lower ends 119b, 121b of the helical springs 119, 121 respectively.

The resiliently mounted tire assembly is adjusted so that the surfaces of the tires 111 and 111' engage the bottom surfaces of the tilt tray assemblies as they pass over the sensor assembly 104 with the resiliency of the springs being adjusted so that the wheels are urged against the bottom surfaces of the frames with a force of the order two (2) to four (4) pounds.

The spring supporting pins 118 and 120 are mounted within elongated slots in the vertical sidewalls of support 106, such as, for example, elongated slot 106c provided in the right-hand vertical side of the support 106 and are adjustable to adjust the spring force.

Figure 9F:
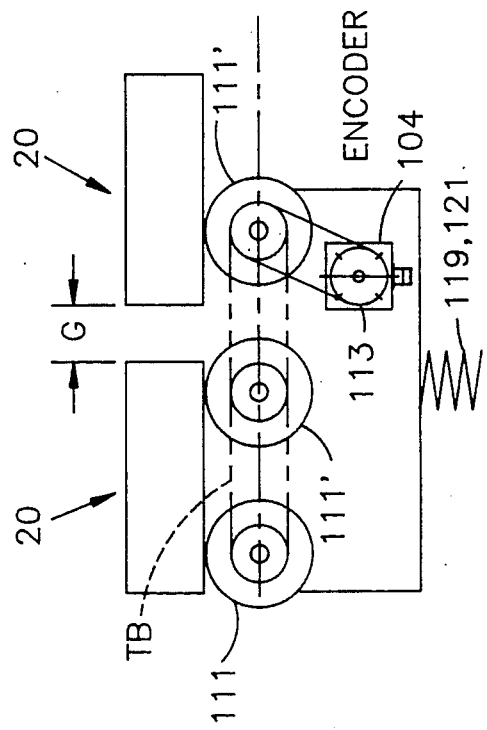
FIG. 9f shows a schematic view of the manner in which the encoder of FIGS. 9-9e cooperates with the tilt tray assembly for monitoring the conveyor velocity.

FIG. 9f shows the manner of operation of the encoder assembly. As was mentioned hereinabove, all three tires are tied together with at least one timing belt and in operation, the tires 111 and 111' are positioned in such a manner that two of the three tires are always in rolling engagement with one of the tilt tray assemblies. The tires are further always maintained in rotation since even a tire moving into the gap G between adjacent tilt tray assemblies 20 will not be free wheeling due to the fact that it is rotated by the timing belt of the remaining two tires which make rolling engagement with the passing tilt tray assemblies 20. Thus, the encoder assembly provides an accurate indication of the operating speed enabling the controller to dynamically adjust for any changes in operating speed by altering the driving signal applied to the linear motors 102. All of the linear motors are coupled in electrical parallel and the nature of the system is such that even the failure of one or two of the linear motors will not require shutdown of the system.

FIGS. 10a-10f show the top loader 17 employed for purposes of loading bundles into the desired tilt tray assembly. Each such top loader is comprised of four support frames 125, each provided with a mounting plate 126 for securement to a support surface.

The vertical support members 125 are secured at their top ends to form a substantially rectangular frame by means of cross pieces 127, 128, 129 and 130 forming a substantially rectangular-shaped frame, each of the cross pieces being of a substantially rectangular-shaped cross-section. Additional cross pieces 131 and 132 are respectively secured to cross pieces 128 and 130 and are arranged in spaced parallel fashion to cross pieces 127 and 129, respectively. A support plate 133 secured to cross pieces 129 and 132 by fasteners F1 supports a pair of bearing assemblies 134, 134 whose lower ends are fastened by suitable fastening means to support plate 133. The bearing assemblies 134, 134 rotatably support a jack shaft 140 which is free-wheelingly rotatable within the bearing assembly and has a first end thereof secured to a timing belt pulley 135 which is driven by a timing belt 136 entrained about a timing belt pulley 137 mounted to the output shaft of a servo-motor 138 which is mounted upon a support bracket 139 which in turn forms an integral part of the support plate 133.

A timing belt pulley 141 is mounted to the opposite end of jack shaft 140. An elongated timing belt 142 is entrained about timing belt pulley 141 and a driven timing belt pulley 143 rotatable about shaft 144 mounted upon support bracket assemblies 145, 145, each having a resilient member 145a, 145a for providing proper tension for timing belt 142. The tensioning assemblies are each provided with threaded fasteners 145b, 145b which extend through and threadedly engage tapped openings in support shaft 144 which is thereby fixedly secured against rotation, timing belt pulley 143 being provided with suitable bearing means for free-wheelingly mounting the timing belt pulley upon shaft 144.

Servo-motor 138 ultimately drives timing belt pulley 142 in a reciprocating fashion for unloading bundles from the top loader conveyor (to be more fully described) and for rapidly resetting the pusher member.

The pusher assembly is comprised of a pair of elongated cylindrical rods 146, 146 which are fixedly secured to cross pieces 131, 132 as shown best in FIG. 10c. A mounting plate 147 is provided with guides 148 arranged along opposite sides of the mounting plate and provided with free-wheeling rollers 148a which rollingly move along the rods 146, 146 to guide the movement of the mounting plate. A pair of vertical mounting brackets 149, 149 are secured to support plate 147 and in turn have pusher plate 150 secured thereto. The vertical mounting brackets 149 have an L-shaped cross-section and are provided with a tapered portion 149a as shown best in FIG. 9a to enhance the inherent supporting strength of vertical brackets 149.

Mounting plate 147 further includes a timing belt clamping member 151 secured to mounting plate 147 by fasteners F2. The bottom surface of clamping member 151 is provided with a gear-like configuration conforming to the toothed configuration of the timing belt 142 and is adapted to interfit with the timing belt so to provide excellent clamping and securement therebetween. Thus, movement of the lower run 142a of timing belt 142 is directly imparted to the pusher 150 through mounting plate 147 and vertical mounting brackets 149.

Figure 10A:
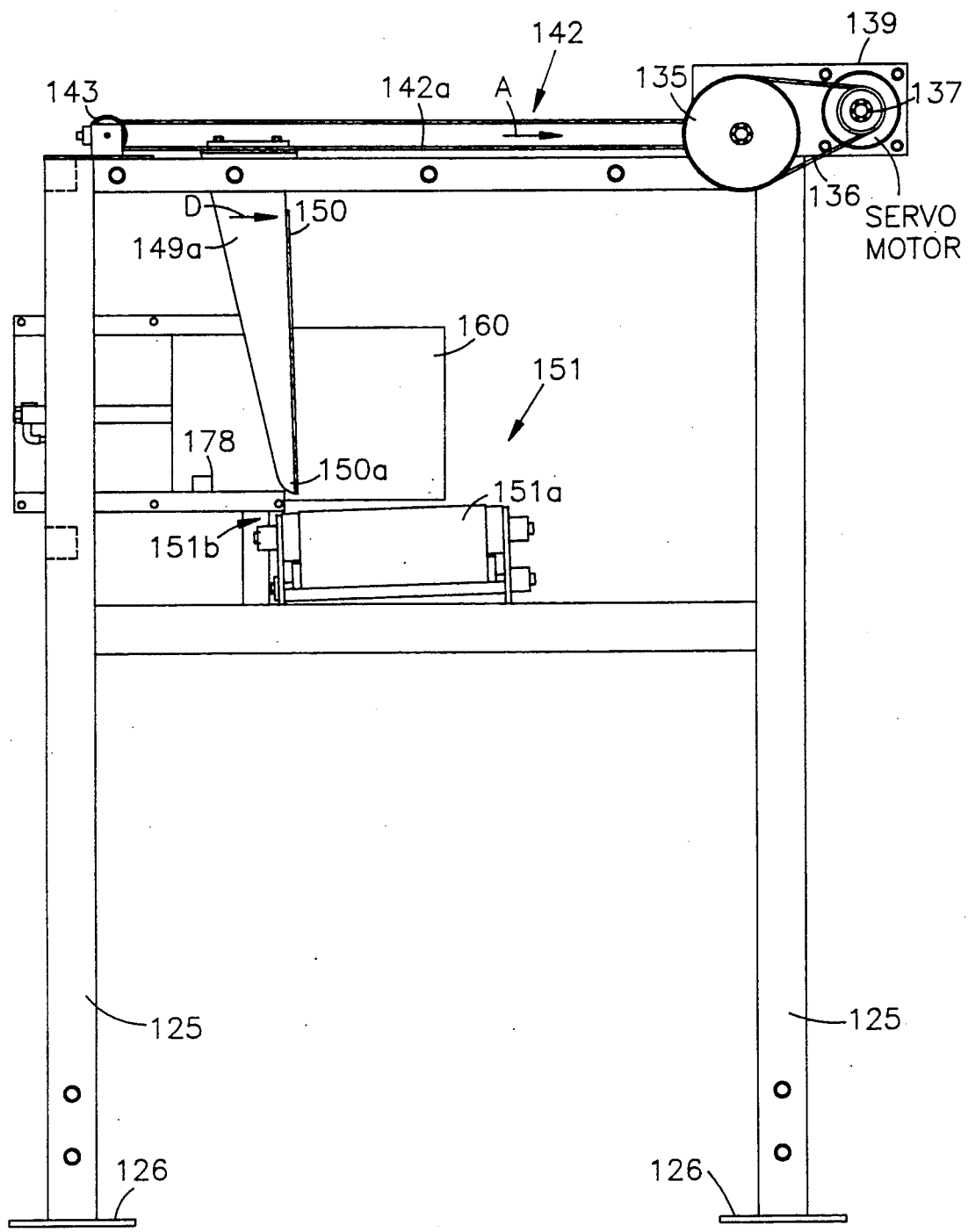

FIGS. 10a and 10c show the position of the pusher preparatory to pushing a bundle from the conveyor assembly (to be more fully described). Servo-motor 138 is rotated to move the lower run 142a of the timing belt in the direction shown by arrow A causing pusher 150 to move in the same direction. The pusher is moved through a distance sufficient to move a bundle to the position to be dispensed off the belt conveyor assembly (to be more fully described) and thereafter to rapidly return to the start position in readiness for dispensing the next bundle.

The conveyor assembly 151 is comprised of a closed loop conveyor belt 152 entrained about a drive roller 153 and driven roller 156 mounted between a pair of support plates 154. A plurality of spaced parallel rollers 155 are free-wheelingly mounted between the plates 154, 154 in the space between rollers 153 and 156 and serve to rollingly support the conveyor belt 152 in the space between the drive roller 153 and the driven roller 156. Motor means 158 moves the drive roller 153 and hence the conveyor belt at the proper linear speed.

Tension adjusting assemblies 157, 157 are arranged on the left and right-hand support plates 154, 154 for adjusting the spacing between driven roller 156 and drive roller 153 to thereby adjust the tension of the conveyor belt 152. The conveyor belt is preferably formed of a suitable low friction material or may be formed of a suitable fabric, for example, which is coated with a material to provide an extremely low friction outer surface to provide a low coefficient of sliding friction. Bundles are introduced onto the conveyor which moves in the direction shown by arrow B in FIG. 10c at a speed commensurate with the mating delivery conveyor.

Figure 10B:
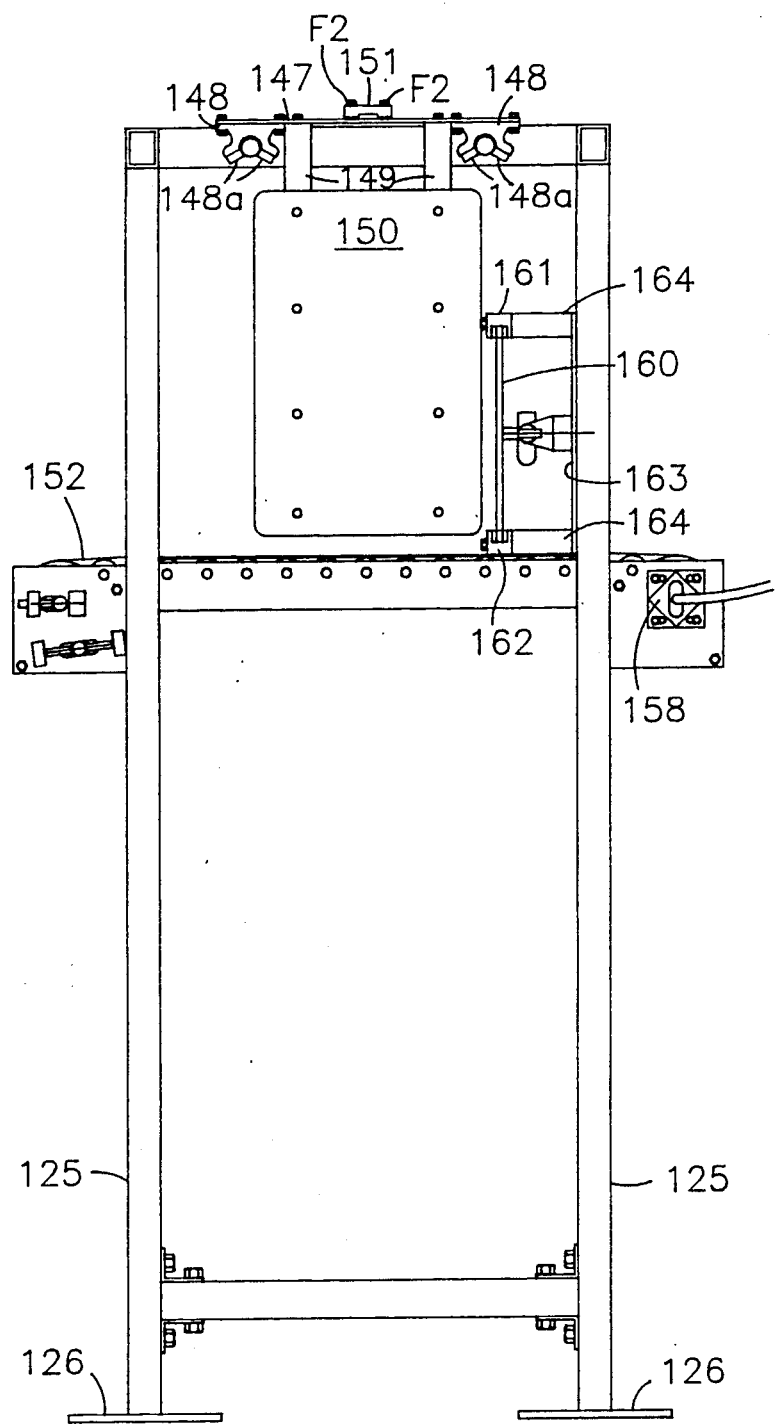
Figure 10D:
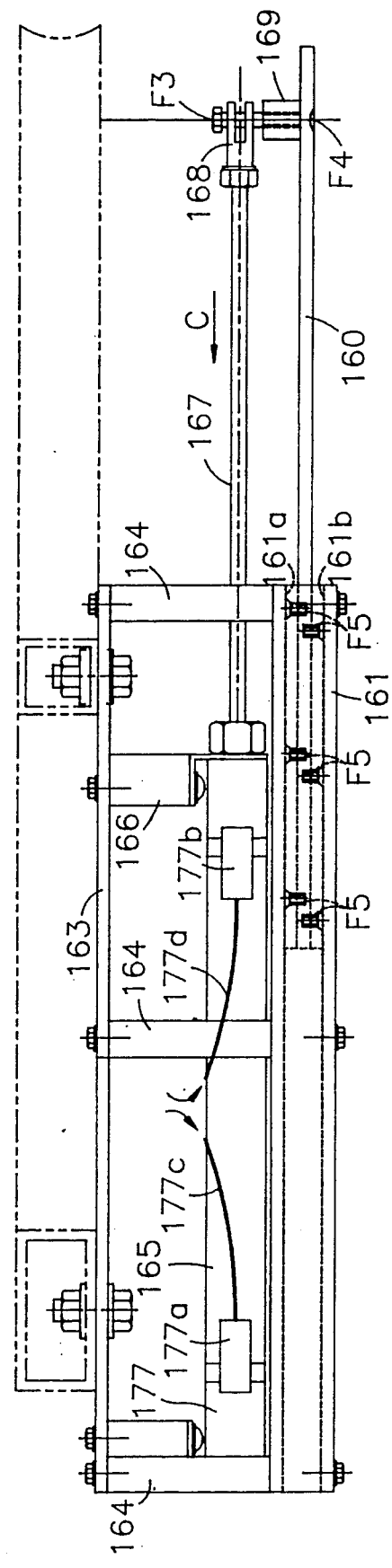
FIGS. 10d and 10e respectively show top and side elevational views of the gate assembly of FIGS. 10a-10c.
Figure 10E:
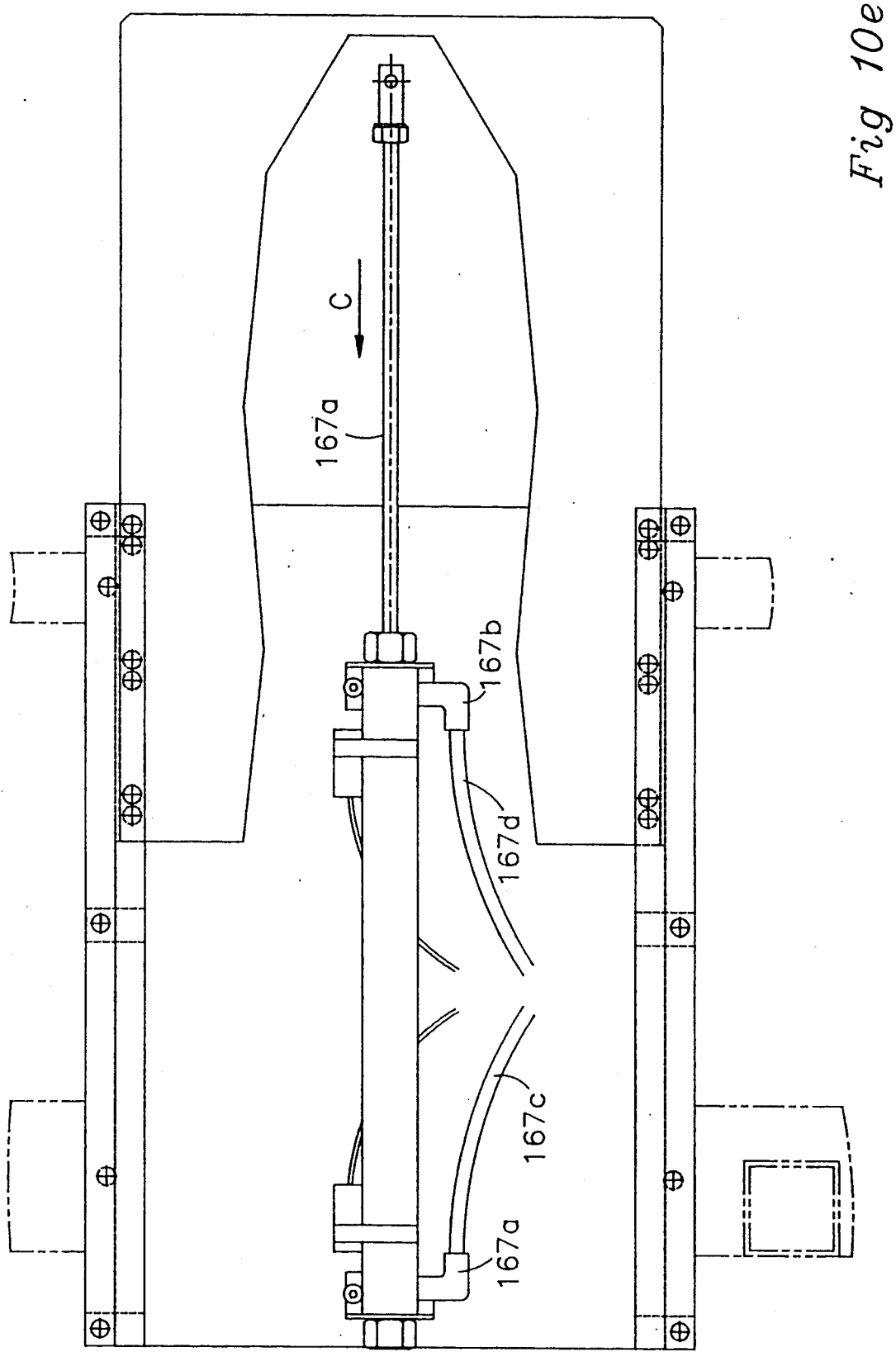
Figure 10F:
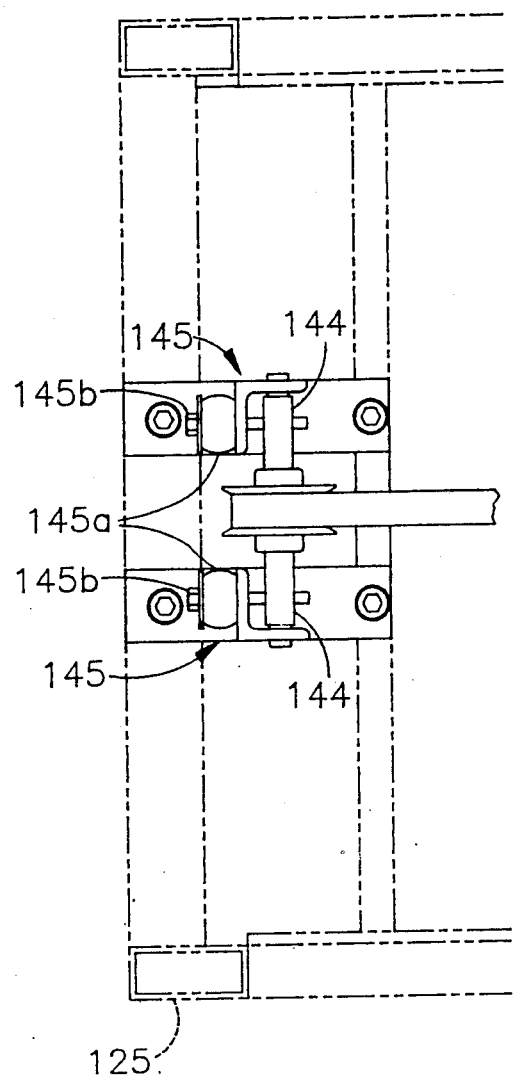
FIG. 10f shows an enlarged view of the assembly of the driven pulley employed as part of the pusher assembly of FIGS. 10a-10c.

A gate assembly is positioned to the downstream side of the pusher 150 and is comprised of a reciprocating gate 160 shown in FIGS. 10a through 10c and shown in greater detail in FIGS. 10d and 10e. Gate 160 is slidably mounted between a pair of upper and lower tracks 161, 162. The tracks are secured to a gate mounting plate 163 by means of supports 164 arranged at both the upper and lower ends. A cylinder 165 is secured to mounting bracket 163 by supports 166. The cylinder 167 is provided with ports 167a, 167b. Conduits 167c, 167d are coupled to suitable pneumatic sources for applying pneumatic pressure to the cylinder whose piston 167 extends outwardly from cylinder 165 and is provided with a clevis 168 at its free end for receiving a fastener F3 for coupling the piston rod 167 to gate 160 which is provided with a mounting member 169 having a tapped opening for receiving fastener F3 and having a tapped opening for receiving a fastener F4 for securing mounting block 169 to gate 160. The head of fastener F4 is flush with the lower surface of gate 160 as shown in FIG. 10d.

The gate 160 is provided with a plurality of fasteners F5 which are threadedly secured to gate 160 and extend in opposite directions therefrom so as to be slidably engaged with the sidewalls of the guide tracks. Noting, for example, FIG. 10d, gate 160 is provided with elongated strips 160a, 160b secured to gate 160 by fasteners F5, said strips slidably engaging the sidewalls of the tracks, the heads of fasteners F5 being flush with the surfaces of the strips so as to provide a low friction surface for engaging the sidewalls of the track.

The operation of the top loader is as follows:

A bundle is delivered from a mating conveyor positioned adjacent to the driven conveyor roller 156 (see FIG. 10c) and moves on to the conveyor which is operated so that its upper run moves in the direction shown by arrow B at a speed which may be the same speed as the mating conveyor if the mating conveyor is powered. However, any conveyor speed commensurate with the delivery rate of bundles may be employed.

A motion sensor 178 (see FIG. 10a) senses the motion of gate 160 due to a bundle moving against the gate, whereupon the controller operates servo-motor 138 to move pusher plate 150 toward the right in a direction shown by arrow B in FIG. 10a to push a bundle off of the belt conveyor when the appropriate tiltable tray assembly is positioned beneath the conveyor assembly 151. Gate 160 limits the travel of a bundle on conveyor belt 152 and also aligns the bundle with the path of movement of the tray assemblies beneath the conveyor. Pusher 150 sweeps the bundle on the conveyor belt 152 off of the right-hand end of the conveyor (relative to FIGS. 10a and 10c) so as to fall upon the tiltable tray assembly moving beneath the top loader assembly.

Although the bundle being delivered is moved off of the conveyor 151 at a rather rapid rate, a portion of the bundle overhanging the right-hand end of the conveyor assembly 151 undergoes a tipping action wherein the right-hand end of the bundle is lowered relative to the left-hand end which is still supported by the conveyor belt. Thus, when a bundle is totally clear of the conveyor belt, it will be tilted as it experiences free fall in dropping into the desired tilt tray assembly. Thus, in order to correct for this, and thereby be assured that each bundle is oriented horizontally as it experiences free fall in dropping into the appropriate tilt tray assembly, the conveyor belt assembly is tilted so that its right-hand end 151a is higher than its left-hand end 151b (note FIG. 10a). Similarly, the guide rods 146, 146 and hence pusher plate 150 are tilted relative to the vertical so that its lower end 150a extends further to the right than its upper end 150b (relative to FIG. 10a) in order to provide a uniform pushing force against the left-hand end of the bundle engaged by pusher plate 150. The tilt angle and path of movement of pusher plate 150 and the tilt angle of the conveyor are preferably equal.

Sensors 177a and 177b serve to positively identify the location of the gate piston rod 167 for assuring the proper positioning thereof and further for assuring the proper control.

Figure 10G:
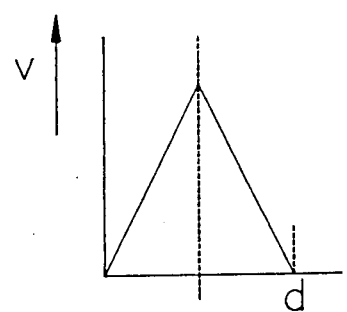
FIG. 10g is a plot showing the manner in which the velocity of the pusher of FIG. 10a is controlled.

As was mentioned hereinabove, the pusher 150 is moved in such a manner that its full stroke occurs within a period of 0.7 seconds. FIG. 10g shows a plot of pusher plate velocity versus distance. The velocity increases from zero until it reaches a maximum at approximate the midpoint of a full stroke at which time the velocity decreases until it reaches the end point of a full stroke. The actual shape of the velocity/time curve is not critical so long as proper stroke interval is maintained and the bundle is properly dispensed. Sensors 179, 180 and 181 serve for sensing the extreme left-hand position, the home position and the forward stroke position respectively of the pusher plate. The sensors cooperate with a rod 147a extending from mounting plate 147 to provide a signal for identifying the position of the pusher plate 150.

The gate 160 may be retracted to enable a bundle or bundles to be delivered to a bypass conveyor 16a aligned with the conveyor 151 and adjacent the conveyor roller 153 (see FIG. 1) for delivery to a truck or any other outfeed location. For example, if all of the bundles from each stacker are the same and can be delivered to any trucks, there is no need to deliver bundles using the closed loop conveyor. Thus, the gate 160 may be retracted and bundles delivered to a bypass conveyor to the loading dock, for example.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Apparatus for use in a conveyor system comprising:
   a body having a longitudinal tilt axis;
   rotatable wheel means arranged near a rear end of said body for rollingly supporting said body;

a support tray swingably mounted upon said body and being swingable along a longitudinal axis substantially coincident with the longitudinal tilt axis;

a coupling releasably secured to the forward end of said body;

said body having a coupling receiving pin near said rear end for receiving the coupling of a similar apparatus;

a locking means on said body;

tilt means coupled to said tray and swingable therewith;

said tilt means including a rod having follower rollers aligned along a predetermined axis of rotation and extending beyond opposite sides of said body;

said tilt means including a swingable locking plate swingable about an axis transverse to said longitudinal axis; and said rotational axis being parallel to said transverse axis;

having means cooperating with said locking means when in a first position to lock the support tray in the upright position;

bias means normally urging said locking plate toward said locking means;

said locking plate being swingable away from said locking means to a second position displaced from said locking means when said tilt means is tilted through a first predetermined angle away from the upright position and said tilting assembly and said tilt tray being tilted in the same direction as said tilting apparatus as said tilting assembly moves through a second predetermined angle.

2. The apparatus of claim 1 wherein one of said locking means and cooperating means comprises a pin and the other of said locking means and said cooperating means comprises an opening for receiving said pin.

3. The apparatus of claim 1 wherein said tilt tray comprises a base portion and sides integral with and substantially surrounding said base portion and cooperating with said base portion for embracing a product deposited upon said base portion.

4. The apparatus of claim 3 wherein said base portion is substantially rectangular and having integral longitudinal sides and two integral lateral sides; said lateral sides each forming nearly a right angle with said base portion.

5. The apparatus of claim 3 wherein said lateral sides form a small acute angle with said base portion.

6. The apparatus of claim 1 wherein said longitudinal and transverse axes are substantially perpendicular to one another.

7. Interconnecting tray assembly members for a product conveyor system each being adapted to support a tiltable tray and being comprised of:

a supporting frame;

said frame having a pair of integral uprights respectively arranged toward the forward and rearward ends of the frame for swingably supporting the tiltable tray above said frame for movement about a first axis;

wheel means rollingly coupled to said frame for rollingly supporting said frame, said wheel means being arranged a spaced distance rearward from the rearward upright of said frame;

a locking pin mounted upon said one of said frame uprights;

a tilting assembly being coupled to said tiltable tray for movement therewith and including a locking plate having means for embracing said locking pin;

said locking plate being swingably mounted to rotate about a second axis transverse to said first axis and including bias means normally urging said embracing means toward said locking pin;

said tilting assembly including a tilt bar extending parallel to said second axis and which, when tilted in a predetermined direction, initially urges said tilting mechanism in a first direction against the force of said bias means to swingably move said locking plate away from said locking pin and thereafter to tilt said tiltable tray when said locking plate is displaced from said locking pin;

the free ends of said tilt bar selectively engaging an activating ramp to tilt said tilt bar.

8. Interconnecting tray assembly members for a product conveyor system each being adapted to support a tiltable tray and being comprised of:

a supporting frame;

a pair of integral uprights on said frame for swingably supporting the tiltable tray above said frame for movement about a first axis;

wheel means rollingly coupled to said frame for rollingly supporting said frame, said wheel means being arranged a spaced distance rearward from the rearward upright of said frame;

a locking means mounted upon said frame;

a tilting assembly being coupled to said tiltable tray for movement therewith and including a locking plate having means for engaging said locking means;

said locking plate being swingably mounted to rotate about a second axis transverse to said first axis and including bias means normally urging said engaging means toward said locking means;

said tilting assembly including a tilt bar normally extending parallel to said second axis, which bar, when tilted in a predetermined direction, initially urges said tilting mechanism in a first direction against the force of said bias means to move said locking plate away from said locking means and thereafter to tilt said tiltable tray when said locking plate is displaced from said locking means.

9. The apparatus of claim 8 wherein said tilt bar is provided with rotatable rollers arranged at each of the ends of said tilt bar for rolling engagement with a tilt initiating device.

10. The apparatus of claim 8 wherein said bias means comprises a torsion spring mounted about the pivot axis of said latching plate and having a first arm engaging said tray and a second arm engaging said tilt bar, said torsion spring normally urging said tilt bar in said first direction.

11. The apparatus of claim 8 wherein said tilting tray assembly members, each further comprise a tip frame pivotally mounted to said frame so as to rotate about the longitudinal axis of said frame;

said tiltable tray being secured to said tip frame;

said tilting assembly being swingably coupled to and mounted upon said tip frame.

12. The apparatus of claim 11 wherein said tilting assembly comprises a pivot pin pivotally mounted to said tip frame;

said tilt bar extending through elongated openings provided in sad tip frame;

a mounting block including means for securing said pivot pin, said tilt bar and said latching plate thereto;

said bias means being positioned on said pivot pin and having a first arm engaging said tray and a second arm engaging said tilt bar and being adapted to urge said mounting block and hence said locking plate in a direction toward said locking means.

13. The apparatus of claim 8 wherein said frame is provided with coupler means at the forward end thereof and a pin at the rearward end thereof for receiving the coupler means of the following tilt tray assembly.

14. The apparatus of claim 13 wherein each of said tray assembly members is further comprised of vertical wheel means free-wheelingly mounted upon the pin receiving said coupler means.

15. The apparatus of claim 13 wherein said tilt bar further comprises resilient means arranged at spaced intervals about said tilt bar so as to be positioned within each of the elongated openings within said tip frame to prevent contact of said tilt bar with said tip frame.

16. The apparatus of claim 11 wherein said tip frame has a substantially rectangular frame shaped configuration comprised of four integral sides surrounding an open central area and a pair of integral arms projecting from one end of said frame, said arms being provided with said openings for receiving said pivot pin and said elongated openings for receiving said tilt bar.

17. The apparatus of claim 8 wherein said wheel means are arranged at one end of said frame, said wheel means comprising a first pair of wheels extending beyond opposite sides of said frame and a single wheel having a rotating axis which is perpendicular with the rotating axis of said first pair of wheels, the axis of rotation being equidistant from said first pair of wheels of said single wheel.

18. The apparatus of claim 8 further comprising closed loop track means having guide surfaces engaging all of said wheels for guiding each tray assembly member about a predetermined closed loop path.

19. A tray conveyor system for receiving and dispensing products comprising:

closed loop track means for supporting and guiding the tray conveyor system;

a closed loop tray conveyor assembly comprised of a plurality of individual tilt tray carrier means each being coupled to the adjacent carrier means respectively located downstream and upstream of each carrier means whereby each carrier means comprises a "link" in a closed loop "chain";

each of said carrier means comprising roller means, said track means including guide means receiving said roller means for guiding each of said carrier means along said closed loop track means;

each of said carrier means including frame means and a tilt tray swingably mounted thereto;

tilt actuating ramp means;

means on each carrier means for abruptly tilting its associated tray responsive to selective engagement with said tilt actuating ramp means;

the bottom surface of each frame means being provided with a conductive sheet-like metallic member;

linear electric motor means mounted on said track means adjacent to said metallic member in such a manner as to provide a small air gap between said linear electric motor means and said metallic member;

said linear electric motor means being energizable to create an electromagnetic field for creating eddy currents in said metallic member to develop a counteracting magnetic field cooperating with the field developed by said linear motor means when said metallic member is in the influence of said electromagnetic field to create a thrust sufficient for moving all of said carrier means in a predetermined direction along said track means whereby substantially continuous propulsion of said tray conveyor is obtained as the metallic members of each of said carrier means passes said linear electric motor means, the counteracting magnetic field dissipating when the metallic member leaves the influence of said electromagnetic field.

20. The apparatus of claim 19 wherein said metallic member is comprised of a pair of laminated metallic plates.

21. The apparatus of claim 19 wherein said metallic member has a substantially rectangular configuration of a predetermined length and width;

said linear electric motor means being of substantially the same shape and size as said metallic member.

22. The apparatus of claim 21 wherein said track means further comprises first and second elongated track portions arranged a spaced distance apart to thereby provide a predetermined gap therebetween;

said linear electric motor means being arranged within said gap and being secured to said track portions;

said wheels aligning said plate with said gap;

said linear electric motor means being positioned immediately beneath said plate and at a distance from said plate means to provide a predetermined substantially uniform air gap between said plate and said linear electric motor means.

23. The apparatus of claim 20 wherein said laminated plates comprise a first steel plate secured to the undersurface of said frame means and an aluminum plate secured to said steel plate.

24. The apparatus of claim 23 wherein the thicknesses of said plates are of the order of 0.120 to 0.130 inches.

25. The apparatus of claim 19 wherein said linear electric motor means comprises a plurality of linear electric motors arranged at spaced intervals along said track means;

power means for continuously energizing all of said linear electric motors.

26. The apparatus of claim 25 wherein said linear electric motors are connected in electrical parallel to said power means.

27. The apparatus of claim 25 wherein said power means comprises a three-phase alternating current power source.

28. The apparatus of claim 19 further comprising control means for adjusting power to all of said linear electric motors for controlling the speed of said conveyor system.

29. The apparatus of claim 25 further comprising control means for adjusting power to said linear electric motors for controlling the speed of said conveyor system.

30. The apparatus of claim 28 further comprising adjustable speed control setting means;

said control means being responsive to said speed control setting means for adjusting the signal applied to said linear electric motors responsive to the setting of said speed control setting means.

31. The apparatus of claim 29 further comprising feedback means for monitoring the speed of said tray conveyor system for generating an electrical feedback signal representing conveyor speed;
said control means comparing said feedback signal with a speed setting signal for controlling the amplitude of all of the linear electric motors to maintain the speed determined by said speed setting means;
said feedback means comprising roller means engaging each of said carrier means as they pass said roller means;
said roller means comprising an encoder and at least first and second rotatable rollers, each being rotatable responsive to rolling engagement with a carrier means; and
drive means coupling said rollers to said encoder whereby rotation of any one of the rollers due to rolling engagement with a carrier means is conveyed to the said encoder.

32. The apparatus of claim 31 further comprising:
converter means coupled to said roller means encoder for converting the rotation of said roller means encoder into an electrical signal representative of conveyor speed.

33. A tray conveyor system for receiving and dispensing products comprising:
closed loop track means for supporting and guiding the tray conveyor system;
a closed loop tray conveyor assembly comprised of a plurality of individual tilt tray carrier means each being coupled to the adjacent carrier means respectively located downstream and upstream of each carrier means whereby each carrier means comprises a "link" in a closed loop "chain";
each of said carrier means comprising roller means, said track means including guide means receiving said roller means for guiding each of said carrier means along said closed loop track means;
each of said carrier means including frame means and a tilt tray swingably mounted thereto;
the bottom surface of each frame means being provided with a conductive sheet-like metallic member;
linear electric motor means mounted on said track means adjacent to said metallic member in such a manner as to provide a small air gap between said linear electric motor means and said metallic member;
said linear electric motor means being energizable to create an electromagnetic field for creating eddy currents in said metallic member to develop a counteracting magnetic field cooperating with the field developed by said linear motor means to create a thrust sufficient for moving all of said carrier means in a predetermined direction along said track means whereby substantially continuous propulsion of said tray conveyor is obtained as the metallic members of each of said carrier means passes said linear electric motor means;
control means for adjusting power to all of said linear electric motors for controlling the speed of said conveyor system;
adjustable speed control setting means;
said control means being responsive to said speed control setting means for adjusting the signal applied to said linear electric motors responsive to the setting of said speed control setting means;
feedback means for monitoring the speed of said tray conveyor system for generating an electrical feedback signal representing conveyor speed;
said controller means comparing said feedback signal with said speed setting signal for controlling the amplitude of all of the linear electric motors to maintain the speed determined by said speed setting means;
said feedback means comprising speed monitoring roller means rollingly engaging said carrier means;
converter means coupled to said roller means for converting the rotation of said roller means into an electrical signal representative of conveyor speed;
said roller means engaging each of said carrier means as they pass said roller means;
said roller means comprising a plurality of rollers and coupling means for coupling all of said rollers to said converting means;
said plurality of roller means being arranged in tandem fashion so as to lie along an imaginary line which is substantially parallel to the path of movement of said conveyor;
said roller means being spaced sufficiently far apart so that at least two of said plurality of rollers are always in engagement with at least one of said tilt tray assemblies.

34. The apparatus of claim 33 wherein three roller means are provided.

35. The apparatus of claim 34 further comprising a support for mounting said feedback means on said track means;
means coupled to said mounting means for resiliently mounting said roller means.

36. The apparatus of claim 33 wherein said means for coupling said rollers to said converting means further couples rotation of each of said rollers to one another.

37. The apparatus of claim 35 wherein said resilient mounting means is coupled to said roller means for causing said roller means to exert a substantially constant force of the order of two to four pounds upon said carrier means.

38. A tray conveyor system including a closed loop tray conveyor for receiving and dispensing products comprising:
closed loop track means for supporting and guiding the tray conveyor;
said tray conveyor being comprised of a plurality of individual tilt tray carrier means each being coupled to the adjacent carrier means respectively located downstream and upstream to each carrier means whereby each carrier means comprises a "link" in a closed loop "chain";
each of said carrier means comprising roller means cooperating with said track means to guide each of said carrier means along said closed loop track means;
each of said tilt tray means including frame means and a tilt tray swingably mounted thereto;
means for swingably mounting a tiltable tray upon said frame means;
tilting means coupled to said swingably mounted tray;
pin means;
said tilting means being tiltable about first and second mutually perpendicular axes;

bias means normally urging said tilting means in a first direction about said first axis for engaging said locking pin means;

said tilting means further comprising a tilting arm having a cam follower roller means mounted thereon;

tip cam means arranged along said track means and having a tip cam member swingable between a first position displaced from said cam follower roller means and a second inclined position which is adapted to cause said roller means to move along the inclined surface of said tip cam member for tilting said tray means.

39. The apparatus of claim 38 further comprising pneumatic means for moving said tip cam between said first and second positions.

40. The apparatus of claim 39 further comprising straightening cam means arranged adjacent said track means downstream relative to said tip cam means for engaging said roller means to move said tilting means to its upright position.

41. The apparatus of claim 39 wherein said tilt bar is provided with a cam follower roller at each of its ends;

first and second straightening cam means arranged along opposite sides of said track means a spaced distance downstream relative to said tip cam means and each being engageable with an associated one of said cam roller means for realigning said tilting mechanism and said tilt tray to the upright position.

42. The apparatus of claim 41 wherein each of said cam straightening means comprises an inclined cam surface whereby at least one of the cam follower rollers engages the associated inclined cam surface to move said tilting mechanism to the upright position and wherein the remaining one of said inclined cam surfaces engages the remaining cam follower roller to prevent overshoot of the tilt mechanism as it is returning to the upright position.

43. The apparatus of claim 38 wherein said tip cam means is comprised of an elongated tip cam pivotally mounted at the first end thereof;

a slide block;

a link pivotally connecting the free end of said tip cam to said side block;

cylinder means for reciprocating said side block whereby movement of said side block in a first direction causes said tip cam free end to be lifted to an inclined position for tilting said tilting mechanism and to be moved to a horizontal position displaced from said tilting mechanism when moved in the opposite direction.

44. The apparatus of claim 43 wherein said tip cam means further comprises an inclined ramp arranged upstream relative to said tip cam for guiding a cam follower roller along an inclined surface preparatory to engagement with the tip cam when in the second position.

45. The apparatus of claim 41 wherein each of said cam straightening means is comprised of a first member having an inclined sloping surface and adjustable means for extending the height of said sloping surface.

46. A tray conveyor system for receiving and dispensing products comprising:

closed loop track means for supporting and guiding the tray conveyor system;

a closed loop tray conveyor assembly comprised of a plurality of individual tilt tray carrier means each being coupled to the adjacent carrier means respectively located downstream and upstream of each carrier means whereby each carrier means comprises a "link" in a closed loop "chain";

each of said carrier means comprising roller means, said track means including guide means receiving said roller means for guiding each of said carrier means along said closed loop track means;

each of said carrier means including frame means and a tilt tray swingably mounted thereto;

the bottom surface of each frame means being provided with a conductive sheet-like metallic member;

linear electric motor means mounted on said track means adjacent to said metallic member in such a manner as to provide a small air gap between said linear electric motor means and said metallic member;

said linear electric motor means being energizable to create an electromagnetic field for creating eddy currents in said metallic member to develop a counteracting magnetic field cooperating with the field developed by said linear motor means to create a thrust sufficient for moving all of said carrier means in a predetermined direction along said track means whereby substantially continuous propulsion of said tray conveyor is obtained as the metallic members of each of said carrier means passes said linear electric motor means;

control means for adjusting power to all of said linear electric motors for controlling the speed of said conveyor system;

feedback means for monitoring the speed of said tray conveyor system for generating an electrical feedback signal representing conveyor speed;

said controller means comparing said feedback signal with said speed setting signal for controlling the linear electric motors to maintain the speed determined by said speed setting means;

said feedback means comprising speed monitoring roller means rollingly engaging said carrier means;

converter means coupled to said roller means for converting the rotation of said roller means into an electrical signal representative of conveyor speed;

said roller means engaging each of said carrier means as they pass said roller means;

said speed monitoring roller means comprising a plurality of rollers;

elongated mounting means for rotatably mounting each of said rollers thereto whereby the axis of rotation of said rollers lie at spaced intervals along and perpendicular to an imaginary straight line;

means coupled to said track means for housing said converter means;

spring means coupled between said housing means and said mounting means for resiliently supporting said mounting means;

said converter means for converting rotational movement into an electrical signal wherein a characteristic of the electrical signal changes in accordance with rotating speed;

means for coupling rotation of all of said roller means to said converter means;

said housing being positioned relative to said track means to place the roller means in a position for rollingly engaging the bottom surfaces of said carrier means;

the spacing between said roller means being sufficient to assure that at least two of said roller means are always in engagement with one or more of said carrier means.

47. The apparatus of claim 46 wherein said speed monitoring means includes three roller means.

48. The apparatus of claim 47 wherein each of said roller means and said encoder means is provided with integral gear means;

means entrained about all of said gear means for maintaining all of said roller means and said converter means rotating at substantially the same angular speed.

49. The apparatus of claim 29 wherein the amplitude of the power is adjusted by said control means for controlling the speed of the system.

50. The apparatus of claim 32 wherein said roller means comprises at least first and second rollers coupled to said converter means for continuously engaging at least one of the carrier means as they pass the speed monitoring means.

* * * * *

UNITED STATES PATENT AND TRADEMARK OFFICE
CERTIFICATE OF CORRECTION

PATENT NO. : 5,054,601
DATED : October 8, 1991
INVENTOR(S) : Sjogren et al.

It is certified that error appears in the above-identified patent and that said Letters Patent is hereby corrected as shown below:

Column 5, line 58, after "tray" insert --assembly arranged immediately behind tilt tray--

Column 11, line 7, change "18" to --118--

Column 16, line 68, change "sad" to --said--

Signed and Sealed this

Sixth Day of April, 1993

Attest:

STEPHEN G. KUNIN

*Attesting Officer*       *Acting Commissioner of Patents and Trademarks*